(12) United States Patent
Sato et al.

(10) Patent No.: US 12,280,311 B2
(45) Date of Patent: Apr. 22, 2025

(54) STORAGE MEDIUM, INFORMATION PROCESSING APPARATUS, INFORMATION PROCESSING SYSTEM, AND GAME PROCESSING METHOD

(71) Applicant: NINTENDO CO., LTD., Kyoto (JP)

(72) Inventors: Haruki Sato, Kyoto (JP); Yuya Sato, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 17/878,218

(22) Filed: Aug. 1, 2022

(65) Prior Publication Data

US 2022/0370910 A1 Nov. 24, 2022

Related U.S. Application Data

(63) Continuation of application No. 17/330,611, filed on May 26, 2021, now Pat. No. 11,426,659.

(30) Foreign Application Priority Data

Jun. 2, 2020 (JP) .................................. 2020-096141

(51) Int. Cl.
A63F 13/57 (2014.01)
(52) U.S. Cl.
CPC .................................... *A63F 13/57* (2014.09)
(58) Field of Classification Search
CPC .......... A63F 13/57; A63F 13/45; A63F 13/52; A63F 13/525; A63F 13/5252;
(Continued)

(56) References Cited

U.S. PATENT DOCUMENTS 11,285,394 B1 * 3/2022 Yamada .................. A63F 13/56
2012/0178531 A1 7/2012 Yamada et al.
(Continued)

FOREIGN PATENT DOCUMENTS

JP 2012-145976 8/2012

OTHER PUBLICATIONS

The Legend of Zelda Breath of the Wild, [online] Nintendo Co., Ltd, [searched on Apr. 21, 2020], internet <https://www.nintendo.co.jp/zelda/index.html>and its English page of https://www.nintendo.com/games/detail/the-legend-of-zelda-breath-of-the-wild-switch/, 9 pages.
(Continued)

*Primary Examiner* — David L Lewis
*Assistant Examiner* — Matthew D Hoel
(74) *Attorney, Agent, or Firm* — Nixon & Vanderhye PC

(57) ABSTRACT

In a special operation mode which receives an operation input for causing a player character that is falling, to perform a special action including a shooting action of shooting a predetermined object, an example of an information processing apparatus changes the posture of the player character that is falling, according to a component, regarding at least a pitch direction, of the direction of a virtual camera based on a camera operation input. In the special operation mode, the information processing apparatus sets a shooting direction of the predetermined object during the shooting action, according to the direction of the virtual camera based on the camera operation input. Moreover, the information processing apparatus controls the player character to perform the shooting action and control the predetermined object to move to the shooting direction, based on a shooting operation input performed by the player.

4 Claims, 19 Drawing Sheets

(58) Field of Classification Search
CPC .... A63F 13/5258; A63F 13/53; A63F 13/837; A63F 2300/6661; A63F 2300/6684; A63F 2300/8076; A63F 13/56; A63F 13/573; A63F 13/5255
See application file for complete search history.

(56) References Cited

U.S. PATENT DOCUMENTS

| | | |
|---|---|---|
| 2012/0184375 A1 | 7/2012 | Okura |
| 2012/0302341 A1* | 11/2012 | Abe .................. A63F 13/211 463/31 |
| 2013/0090165 A1* | 4/2013 | Shikata ............. A63F 13/428 463/31 |
| 2013/0090168 A1* | 4/2013 | Shikata ............. A63F 13/428 463/37 |
| 2021/0205706 A1* | 7/2021 | Lutz .................. A63F 13/537 |
| 2021/0370179 A1* | 12/2021 | Sato .................. A63F 13/5255 |
| 2021/0394068 A1* | 12/2021 | Aonuma ............ A63F 13/57 |
| 2022/0258054 A1* | 8/2022 | Matsumoto ........ A63F 13/42 |
| 2022/0258055 A1* | 8/2022 | Sato .................. A63F 13/42 |
| 2022/0370910 A1* | 11/2022 | Sato .................. A63F 13/5258 |
| 2023/0191254 A1* | 6/2023 | Iwao ................. A63F 13/56 |

OTHER PUBLICATIONS

Jan. 29, 2024 Notice of Allowance issued in Japanese Patent Application No. 2020-096141, pp. 1-3 [machine translation included].

* cited by examiner

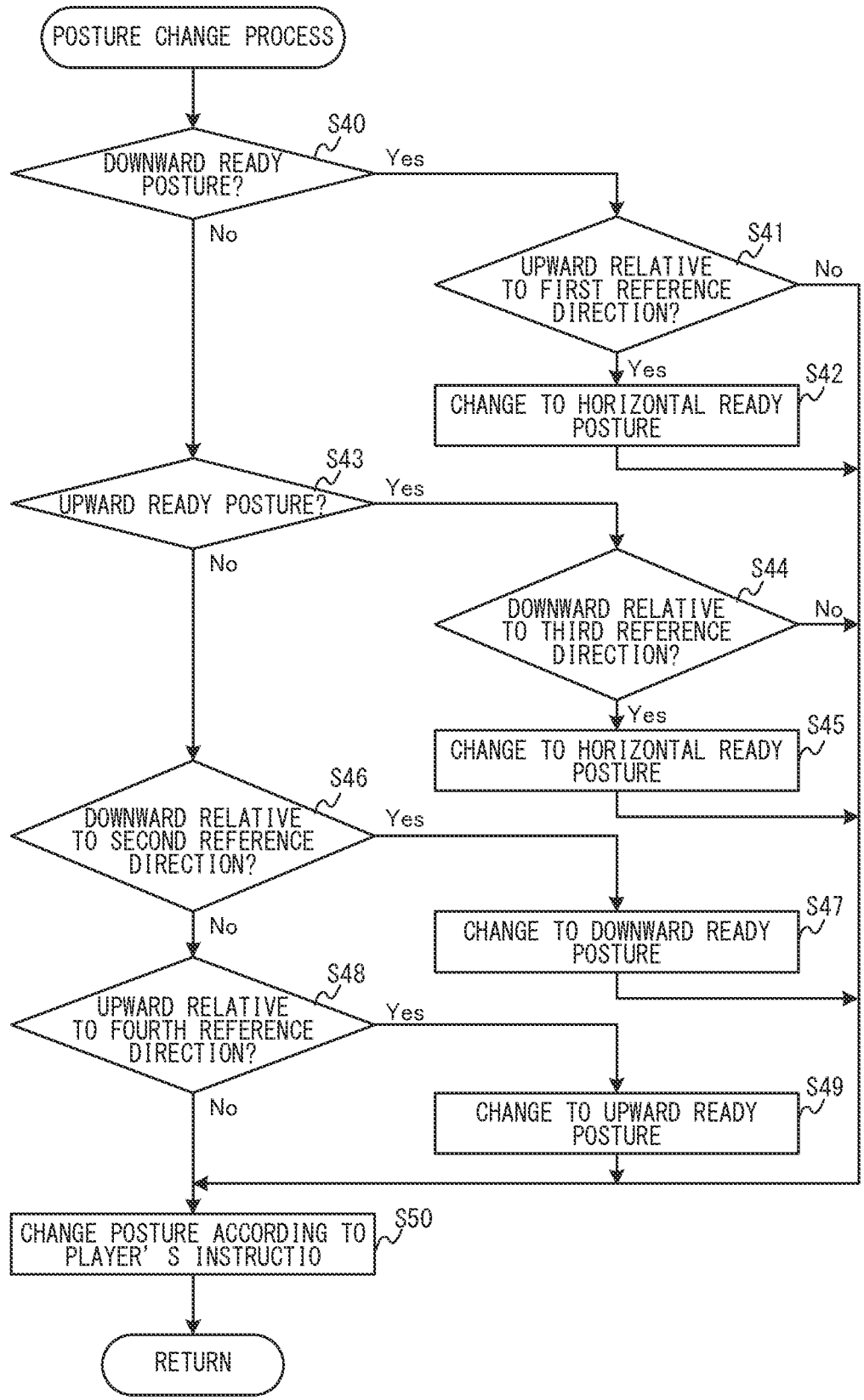

STORAGE MEDIUM, INFORMATION PROCESSING APPARATUS, INFORMATION PROCESSING SYSTEM, AND GAME PROCESSING METHOD

CROSS REFERENCE TO RELATED APPLICATION

This application is a continuation of application Ser. No. 17/330,611 filed on May 26, 2021, which claims priority to Japanese Patent Application No. 2020-96141, filed on Jun. 2, 2020, the entire content of each of which are incorporated herein by reference.

FIELD

The technique shown here relates to a storage medium, an information processing apparatus, an information processing system, and a game processing method for controlling the posture of a player character.

BACKGROUND AND SUMMARY

Conventionally, in a virtual game space, a player character is caused to perform an action of shooting an arrow with a bow while the player character is in the air.

Since the player character shoots the arrow in a standing position, when it is premised that the player character should take a natural posture, the player character cannot shoot the arrow vertically downward, which may restrict the direction to which the player character can shoot the arrow.

Therefore, the present application discloses a storage medium, an information processing apparatus, an information processing system, and a game processing method capable of increasing the degree of freedom of the direction in which a player character performs an action while naturally expressing the posture of the player character in the air.

(1) An example of a non-transitory computer-readable storage medium stores a game program to be executed by a processor in an information processing apparatus. The program causes the processor to execute controlling a player character in a virtual space, based on an operation input performed by a player. In a falling state in which the player character is falling in the virtual space, the program causing the processor to execute: controlling at least one of a falling direction and a falling velocity of the player character that is falling, based on a character operation input performed by the player; controlling a posture of the player character that is falling, based on a character operation input performed by the player; controlling a direction of a virtual camera, based on a camera operation input performed by the player; and controlling a position of the virtual camera such that at least the player character is included in a field of view of the virtual camera, based on a position of the player character and the direction of the virtual camera. In a special operation mode which receives an operation input for causing the player character that is falling to perform a special action including a shooting action of shooting a predetermined object, the program causing the processor to execute: changing the posture of the player character that is falling, according to a component, regarding at least a pitch direction, of the direction of the virtual camera based on the camera operation input; setting a shooting direction of the predetermined object during the shooting action, according to the direction of the virtual camera based on the camera operation input; and controlling the player character to perform the shooting action and controlling the predetermined object to move to the shooting direction, based on a shooting operation input performed by the player.

According to the configuration of the above (1), in the special operation mode, the posture of the player character changes according to the direction of the virtual camera. Therefore, the degree of freedom of the shooting direction in which the shooting action is performed can be increased while naturally expressing the posture of the falling player character.

(2) The game program may cause the processor to execute: in the falling state, controlling the player character such that the posture of the player character corresponds to at least one of a plurality of types of postures including a posture in which an upward direction of the player character is directed downward in the virtual space, and a posture in which a forward direction of the player character is directed downward in the virtual space; and in the falling state, controlling at least one of the falling direction and the falling velocity according to the posture of the player character.

According to the configuration of the above (2), the posture of the player character that is falling can be diversified, and the player character can be moved in a falling direction and/or at a falling velocity according to the posture of the player character.

(3) The game program may cause the processor to execute, in the special operation mode, controlling a motion of the player character such that the player character takes a ready posture for the shooting action, toward a direction according to the component, regarding at least the pitch direction, of the direction of the virtual camera based on the camera operation input.

According to the configuration of the above (3), the player character can be caused to perform a natural shooting action, and the player can easily recognize the shooting direction.

(4) The game program may cause the processor to execute, in the special operation mode, changing the ready posture of the player character, as a change in the posture of the player character according to the component, regarding at least the pitch direction, of the direction of the virtual camera.

According to the configuration of the above (4), the player character can be caused to take a natural ready posture according to the shooting direction.

(5) The game program may cause the processor to execute, in the special operation mode, changing the posture of the player character such that an upward direction of the player character is directed upward in the virtual space, in response to that the component, regarding the pitch direction, of the direction of the virtual camera is changed from a state being downward relative to a first reference direction to a state of being upward relative to the first reference direction.

According to the configuration of the above (5), the natural posture of the player character can be maintained when the shooting direction changes in response to that the direction of the virtual camera is changed from the state of being downward relative to the first reference direction to the state of being upward relative to the first reference direction.

(6) The game program may cause the processor to execute, in the special operation mode, changing the posture of the player character such that the upward direction of the player character is directed downward in the virtual space or a forward direction of the player character is directed downward in the virtual space, in response to that the component, regarding the pitch direction, of the direction of the virtual camera is changed from a state of being upward relative to a second reference direction, which is the same as or different from the first reference direction, to a state of being downward relative to the second reference direction.

According to the configuration of the above (6), the natural posture of the player character can be maintained when the shooting direction changes in response to that the direction of the virtual camera is changed from the state of being upward relative to the second reference direction to the state of being downward relative to the second reference direction.

(7) The first reference direction may be upward relative to the second reference direction.

According to the configuration of the above (7), it is possible to reduce the risk of an unnatural motion of the player character such that the posture of the player character frequently changes according to change in the direction of the virtual camera.

(8) The game program may cause the processor to execute, in the special operation mode, setting the posture of the player character at a start of the special operation mode, according to the posture of the player character immediately before the start of the special operation mode.

According to the configuration of the above (8), the posture of the player character before and after the transition to the special operation mode can be made natural.

(9) The game program may cause the processor to execute, in the falling state, setting the virtual camera such that the direction of the virtual camera is directed upward in the virtual space, based on a direction change operation input performed by the player.

According to the configuration of the above (9), the player can easily perform the operation of turning the virtual camera upward, thereby enhancing operability for the game.

(10) The game program may cause the processor to further execute, in the falling state, setting the posture of the player character such that a forward direction of the player character is directed upward in the virtual space, based on the direction change operation input.

According to the configuration of the above (10), the posture of the player character can be easily changed, thereby enhancing operability for the player character. According to the configurations of the above (9) and (10), the player can intuitively recognize that the posture of the player character has changed, by the change in the direction of the virtual camera.

(11) In the falling state, the game program may cause the processor to execute starting the special operation mode in response to that a predetermined key input by the player is started. The shooting operation input may be an input to end the predetermined key input for starting the special operation mode. The game program may cause the processor to execute ending the special operation mode, based on an end operation input performed by the player.

According to the configuration of the above (11), the player can start and end the special operation mode through a series of operations such as performing a predetermined key input and ending the key input, whereby operability regarding the operations to start and end the special operation mode can be enhanced.

(12) The game program may cause the processor to execute, in the special operation mode, displaying an animation showing a state in which the player character appears to fall at a falling velocity lower than the falling velocity of the player character when it is not in the special operation mode.

According to the configuration of the above (12), operability of the operation of causing the player character to perform the shooting action can be enhanced.

This specification discloses examples of an information processing apparatus and an information processing system which execute the processes in the above (1) to (12). This specification also discloses an example of a game processing method for executing the processes in the above (1) to (12).

According to the storage medium, the information processing apparatus, the information processing system, or the game processing method described above, the degree of freedom of the direction in which the player character performs an action can be increased while naturally expressing the posture of the player character in the air.

These and other objects, features, aspects and advantages of the exemplary embodiment will become more apparent from the following detailed description when taken in conjunction with the accompanying drawings.

BRIEF DESCRIPTION OF THE DRAWINGS

FIG. 19 is a sub-flowchart showing an example of a specific flow of a posture change process in step S29 shown in FIG. 18.

DETAILED DESCRIPTION OF NON-LIMITING EXAMPLE EMBODIMENTS

1. Configuration of Game System

A game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
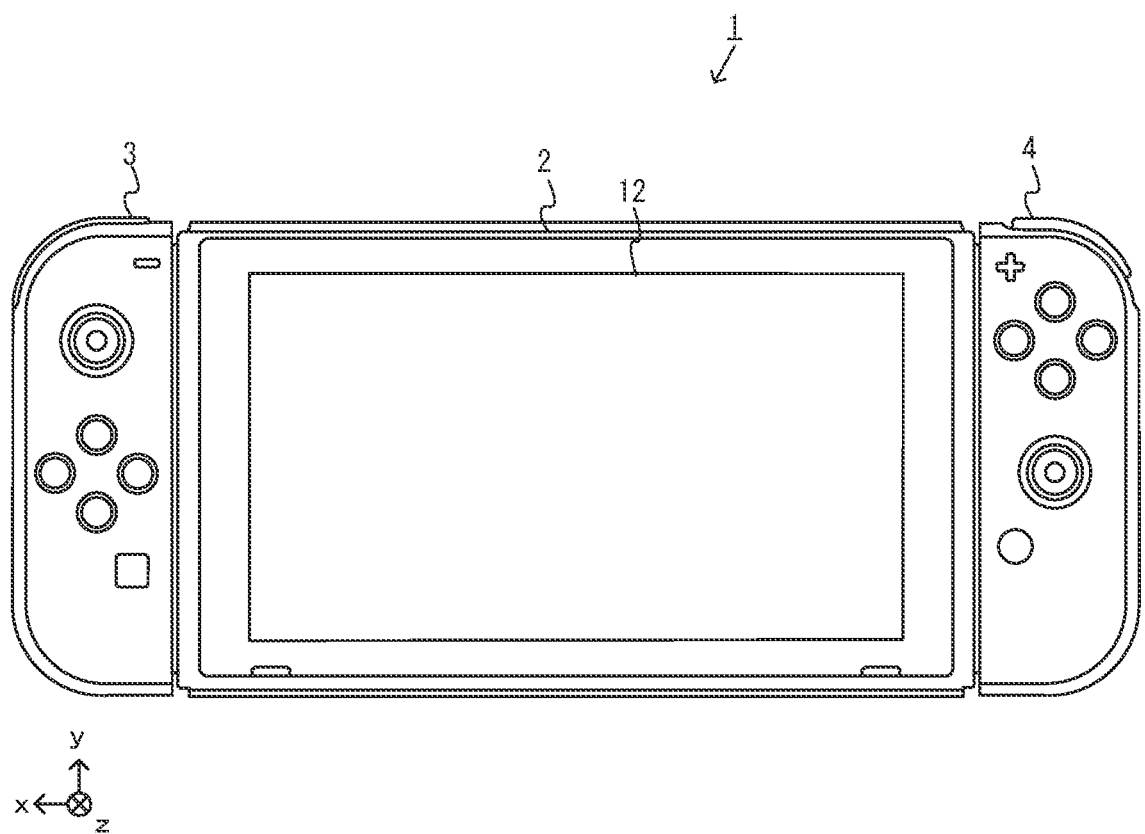
FIG. 1 is a diagram showing an example of a state where non-limiting left and right controllers are attached to a non-limiting main body apparatus.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
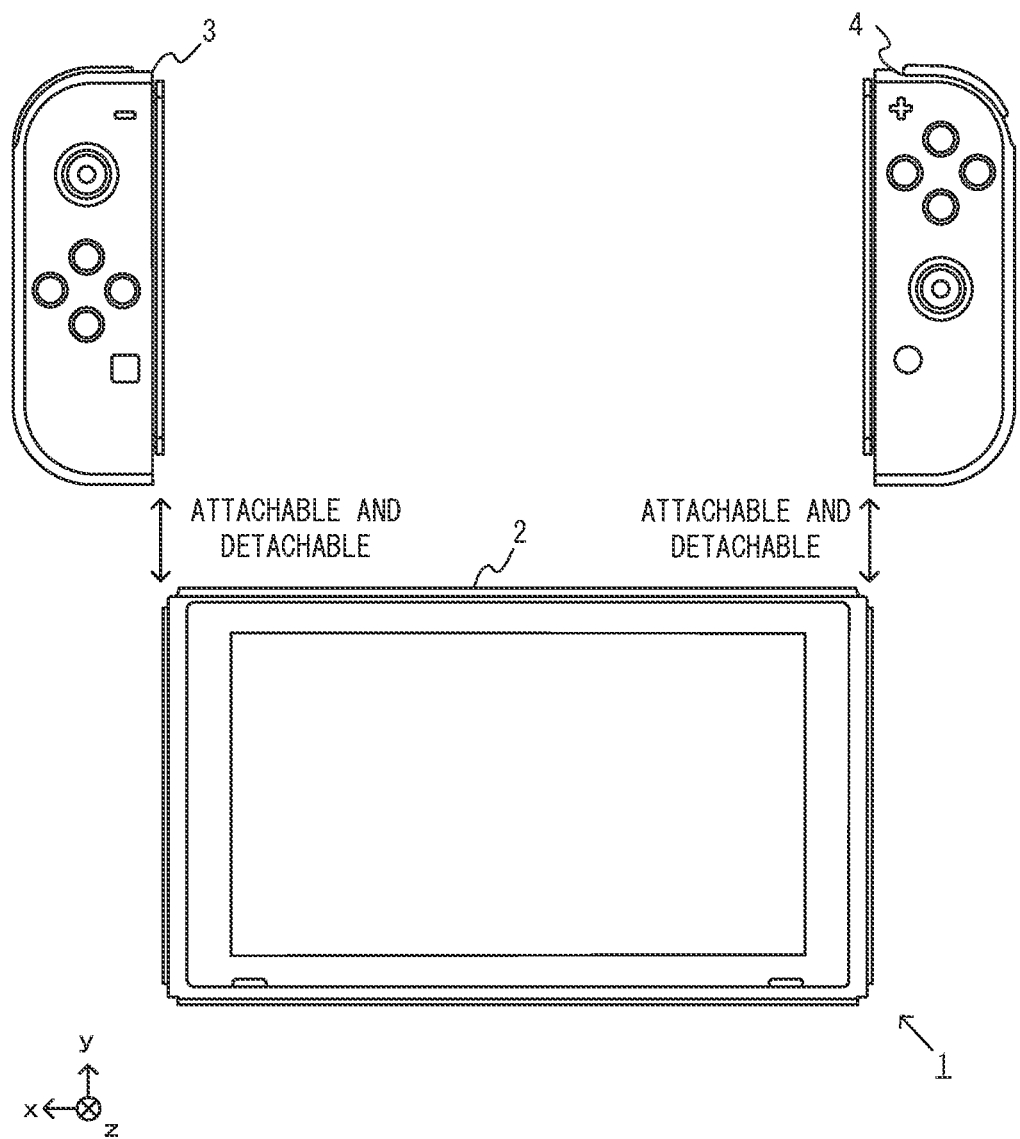
FIG. 2 is a diagram showing an example of a state where each of the non-limiting left and right controllers is detached from the non-limiting main body apparatus.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
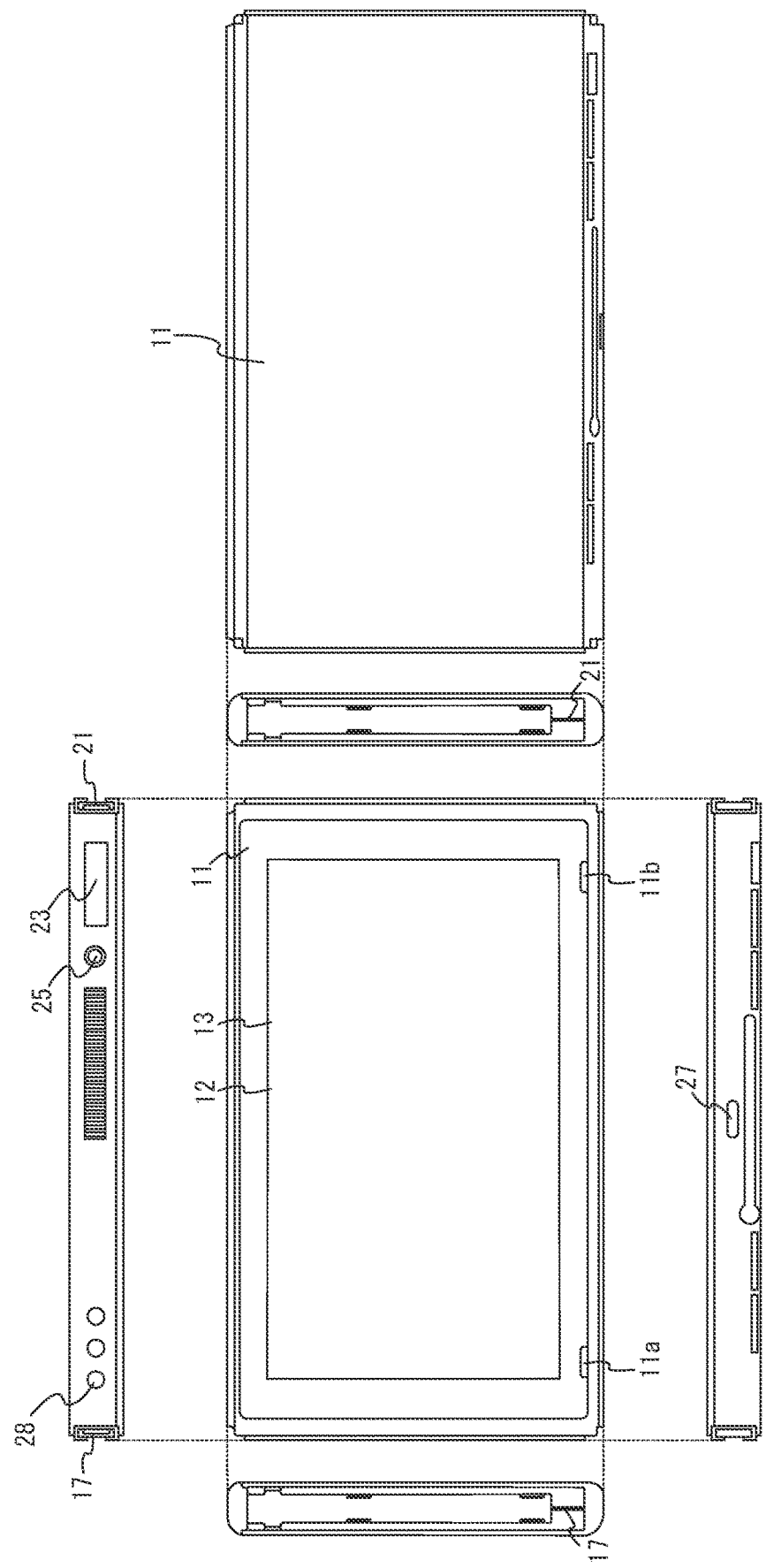
FIG. 3 is six orthogonal views showing an example of the non-limiting main body apparatus.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
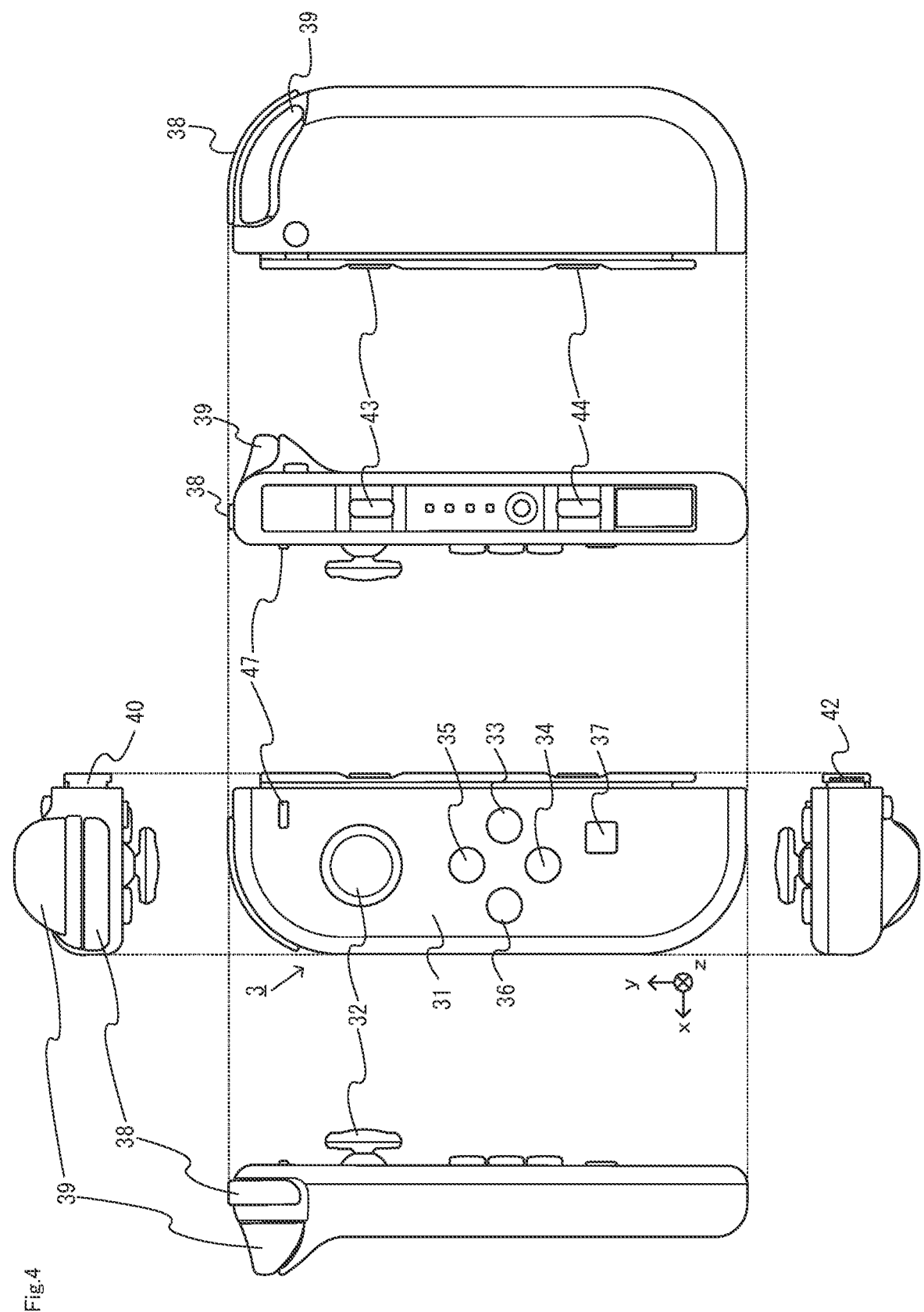
FIG. 4 is six orthogonal views showing an example of the non-limiting left controller.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
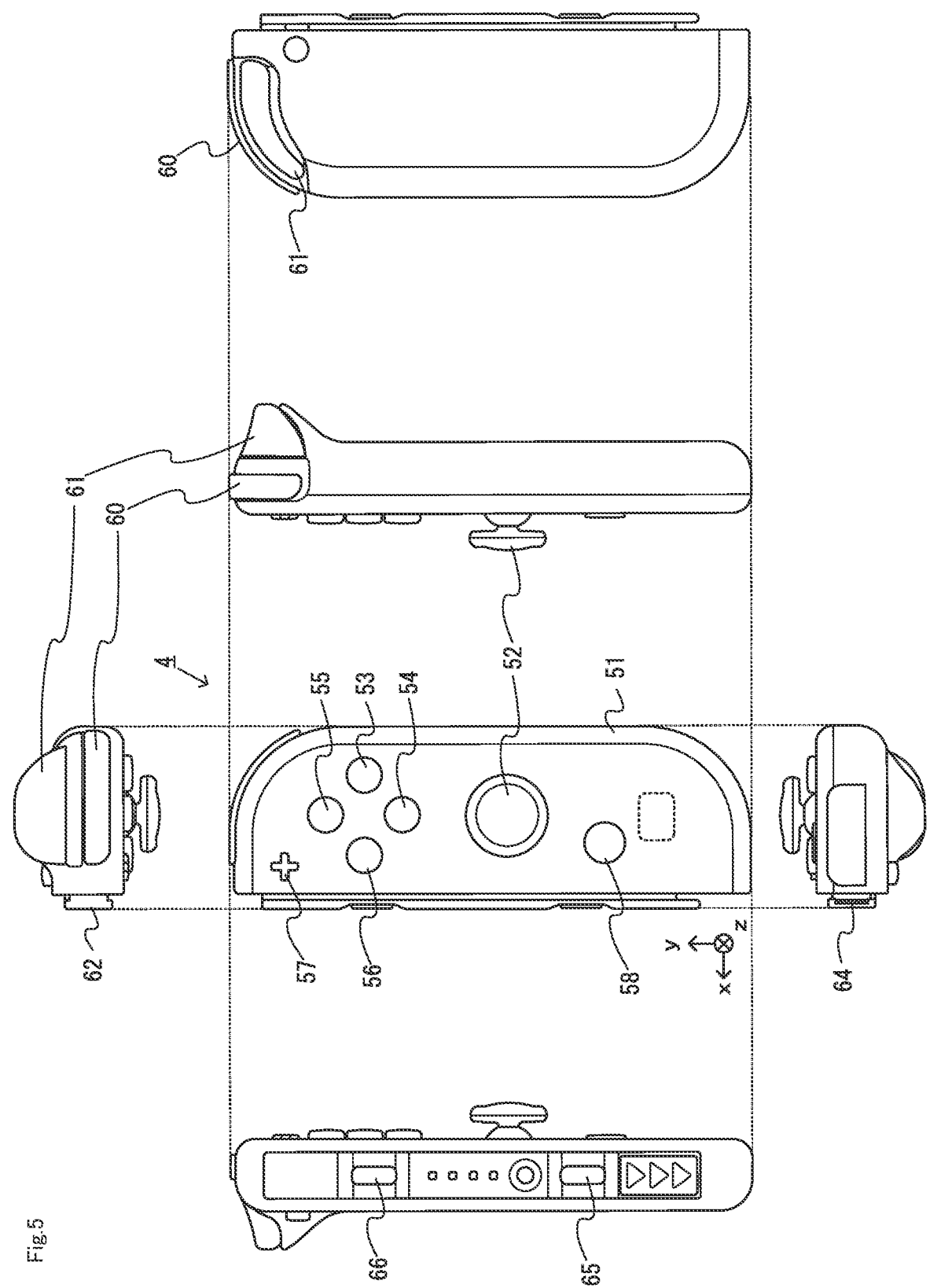
FIG. 5 is six orthogonal views showing an example of the non-limiting right controller.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
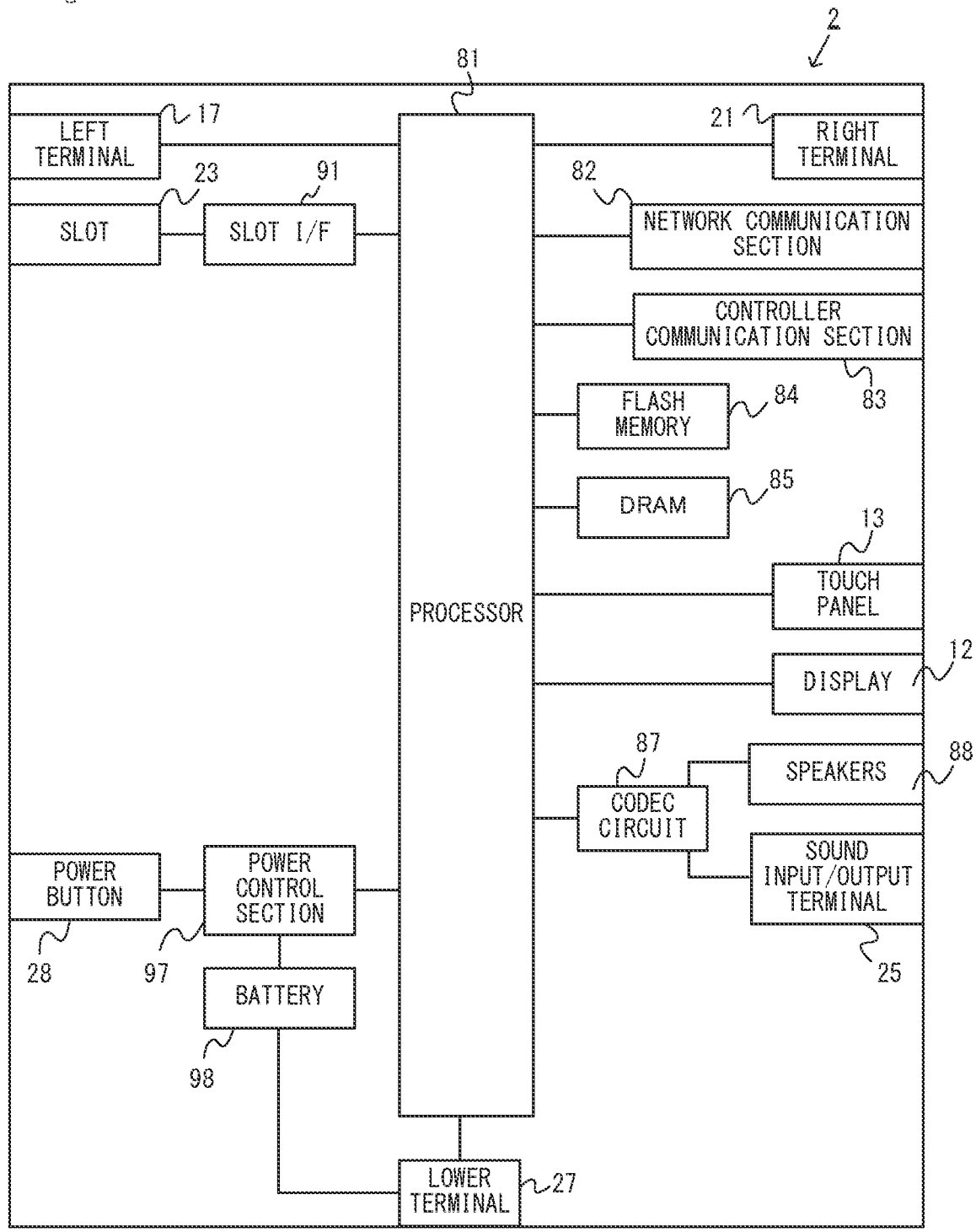
FIG. 6 is a block diagram showing an example of an internal configuration of the non-limiting main body apparatus.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
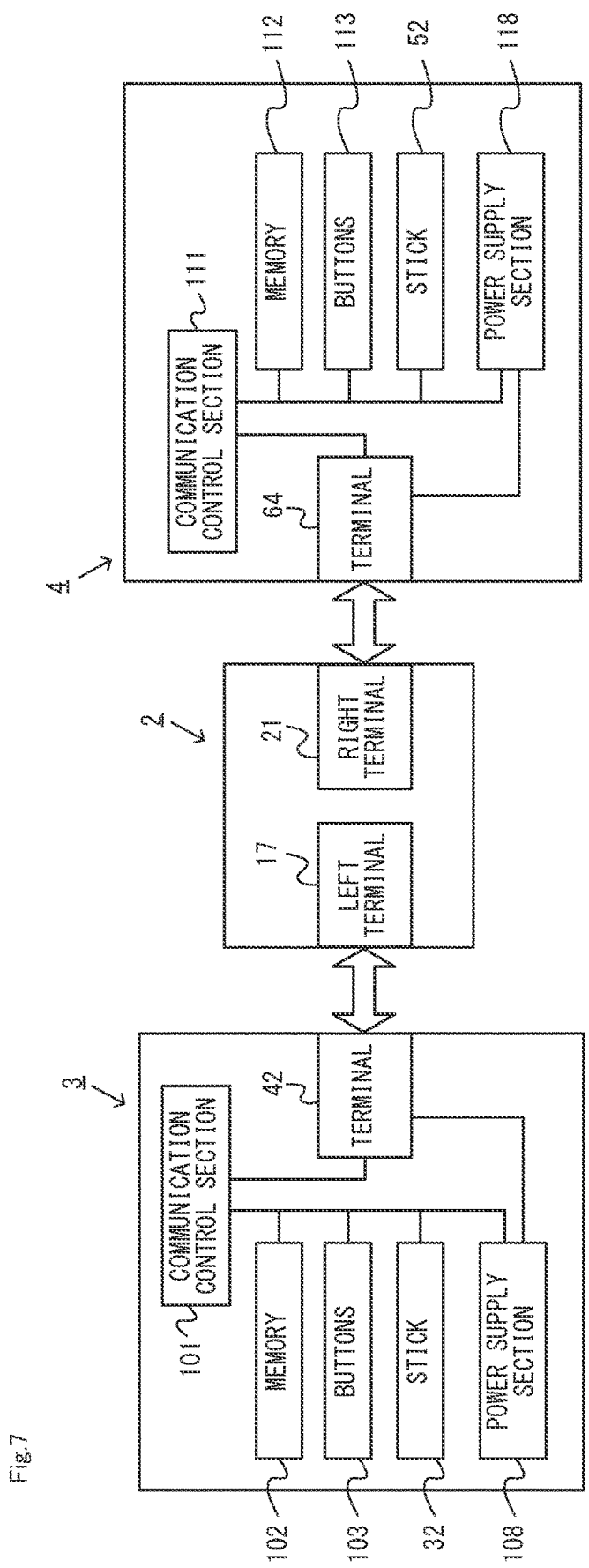
FIG. 7 is a block diagram showing examples of internal configurations of the non-limiting main body apparatus and the non-limiting left and right controllers.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The communication control section 101 acquires information regarding an input (specifically, information regarding an operation or the detection result of the sensor) from each of input sections (specifically, the buttons 103, and, the analog stick 32). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, and, the analog stick 52. These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

2. Outline of Processing in Game System

An outline of game processing performed in a game system 1 will be described with reference to FIGS. 8 to 15. In the exemplary embodiment, in a game according to the game processing, a player character operated by a player (in other words, a user) moves in a virtual three-dimensional game space. In the game space, the player character falls in the air when it dives from a height, for example. In the exemplary embodiment, the player can perform several operations to the falling player character. Hereinafter, motion control for the player character that is falling in the air in the game space will be mainly described.

2-1. Posture While Falling

In the exemplary embodiment, the player character can take five falling states as follows.
normal falling
low-velocity falling
diving falling
backward falling
high-velocity falling The game system 1 controls the player character so that the player character takes different postures for the respective falling states (see FIG. 8).

In this specification, a "posture" of the player character includes a pose and a stance, of the player character, that the player can recognize. That is, the phrase "the posture of the player character varies" means that the pose and/or the stance of the player character varies.

Figure 8:
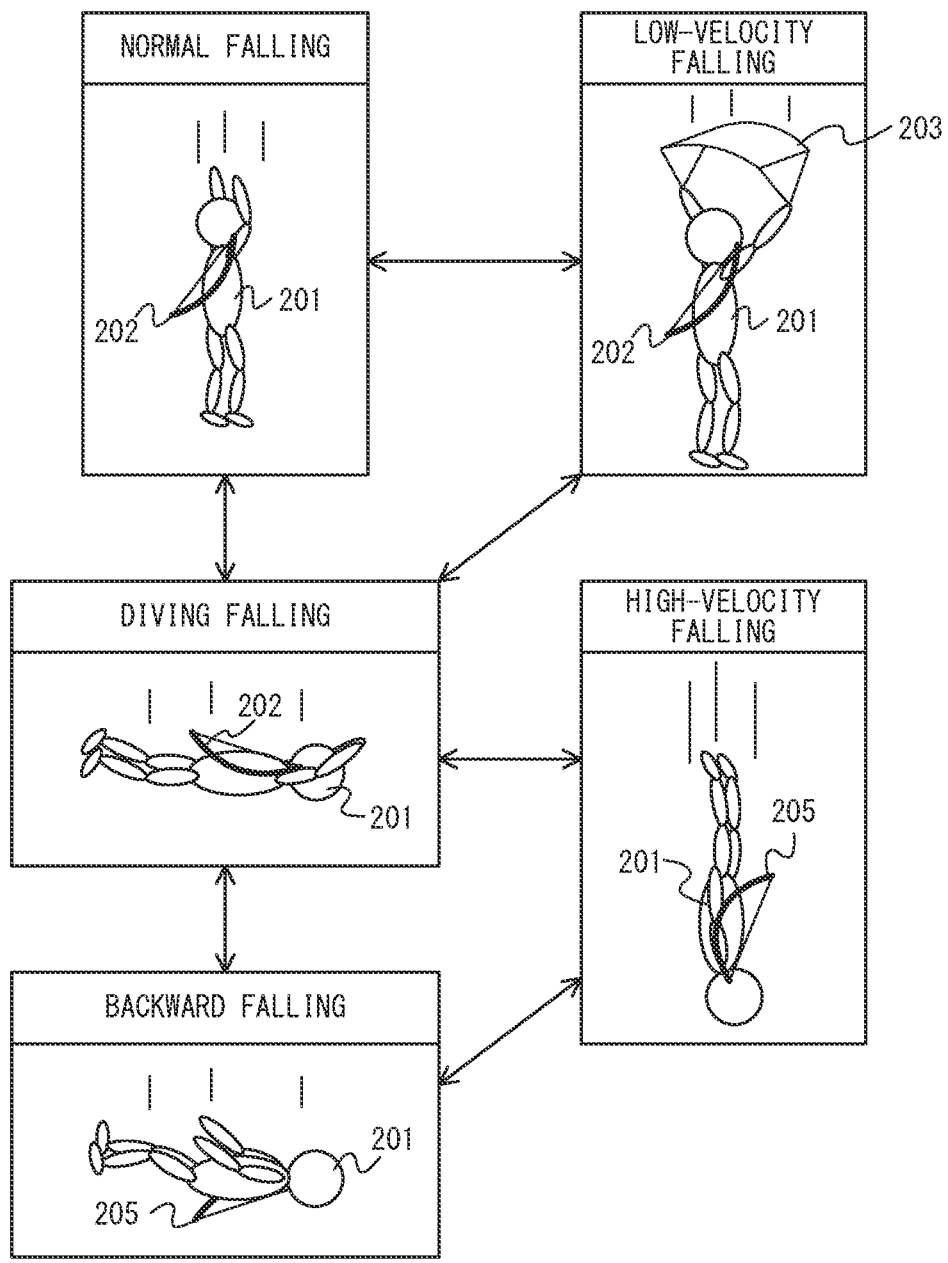
FIG. 8 shows an example of falling states that a player character can take.

FIG. 8 shows an example of the falling states that the player character can take. In the exemplary embodiment, a player character 201 is able to shoot an arrow by using a bow, and possesses a bow object 202. Although described later in detail, the player character 201 takes a posture of holding a bow when shooting an arrow. On the other hand, when the player character does not hold the bow, the player character 201 carries the bow object 202 on its back (see FIG. 8).

As shown in FIG. 8, the normal falling is a state where the player character 201 falls with its head upward in the game space while taking a posture as if standing with its arms a little up. In the exemplary embodiment, the player character 201 firstly takes the posture of normal falling when it falls from a height without performing a jumping action described later. During the normal falling, the player cannot performs an operation of moving the player character 201.

That is, during the normal falling, the player character 201 falls downward according to the laws of physics (e.g., the law of motion and the law of gravity) adopted in the game.

The player character 201 in the state of normal falling transitions to the state of low-velocity falling, according to an item use instruction by the player (e.g., an input instruction performed by pressing the X-button 55 of the right controller 4) (see FIG. 8). Moreover, the player character 201 in the state of normal falling transitions to the state of diving falling, according to a diving instruction by the player (e.g., an input instruction performed by pressing the first R-button of the right controller 4, or an input instruction performed by tilting the analog stick 32 of the left controller 3 upward) (see FIG. 8).

As shown in FIG. 8, the low-velocity falling is a state where the player character 201 falls in a posture of hanging from an item 203 which imitates a parachute. During the low-velocity falling, the player character 201 falls with its head upward in the game space, like the normal falling. During the low-velocity falling, the player character 201 falls at a falling velocity lower than that of the normal falling (specifically, at the lowest falling velocity among the five falling states). During the low-velocity falling, the player character 201 falls as if gliding while traveling forward. In the exemplary embodiment, during the low-velocity falling, the player character 201 falls while moving leftward and rightward, according to a left/right movement instruction by the player (e.g., an input instruction performed by tilting the analog stick 32 of the left controller 3). Specifically, during the low-velocity falling, the player character 201 falls as if turning to the left and right (e.g., curving to the left and right while traveling forward), according to the left/right movement instruction. The player character 201 in the state of low-velocity falling transitions to the state of normal falling, according to an item end instruction by the player (e.g., an input instruction performed by pressing the B-button 54 of the right controller 4) (see FIG. 8).

While the player character 201 is falling, the position and the direction of a virtual camera for generating a game image are changed according to a camera instruction by the player (e.g., an input instruction performed by tilting the analog stick 52 of the right controller 4). For example, the virtual camera moves so as to rotate in the yaw direction according to the camera instruction in the left-right direction, and moves so as to rotate in the pitch direction according to the camera instruction in the up-down direction (see FIG. 10). Moreover, in the exemplary embodiment, when the player character 201 is falling, the virtual camera is controlled such that the position and the direction thereof allow the player character 201 to be included in the field of view of the virtual camera.

The player character 201 in the state of low-velocity falling transitions to the state of diving falling, according to a diving instruction by the player (e.g., an input instruction performed by pressing the first R-button 60 of the right controller 4) (see FIG. 8).

As shown in FIG. 8, the diving falling is a state where the player character 201 falls with a forward direction thereof (i.e., the forward direction based on the direction of the player character 201) being directed downward in the game space, while taking a posture of stretching its arms and legs outward (like sky diving). During the diving falling, the player character 201 falls at a falling velocity lower than that of the normal falling and higher than that of the low-velocity falling. In the exemplary embodiment, the player character 201 can transition from the state of normal falling to the state of diving falling as described above. If the player character 201 falls from a height while performing a jumping action (e.g., an action of jumping from the height), the player character 201 firstly takes the posture of diving falling.

In this specification, the phrase "a certain direction is directed downward" includes a state where this direction is directed vertically downward, and a state where this direction is directed substantially downward. For example, if the certain direction has an angle of 20° with respect to the vertically downward direction, it can be said this certain direction is directed downward. Likewise, the phrase "a certain direction is directed upward" includes a state where this direction is directed vertically upward, and a state where this direction is directed substantially upward.

Figure 9:
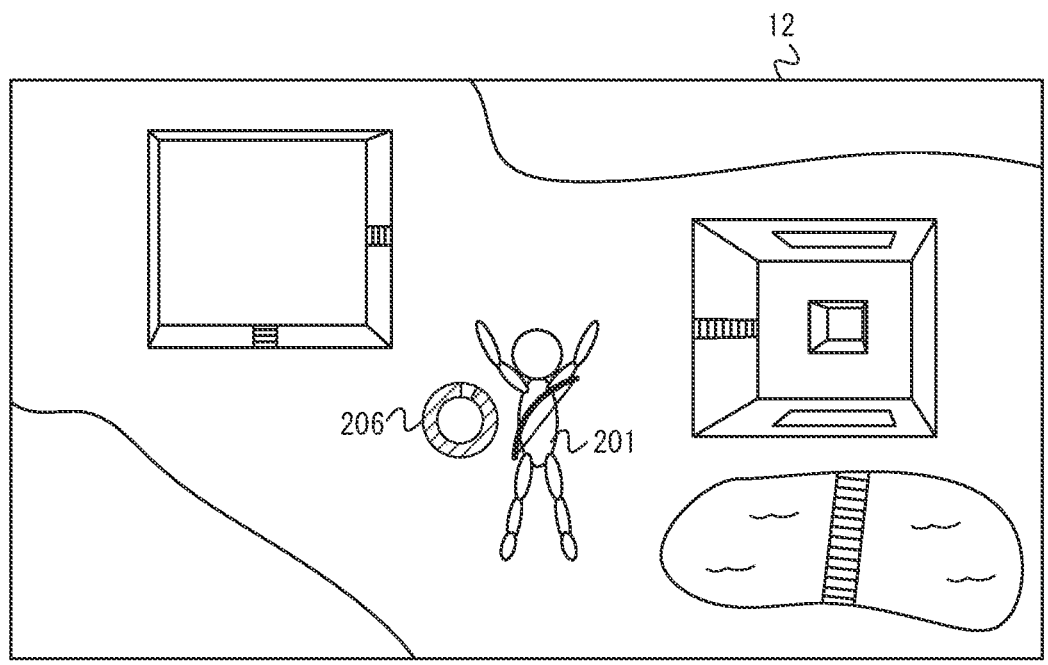
FIG. 9 shows an example of a game image displayed when the player character is in the state of diving falling.

FIG. 9 shows an example of a game image displayed when the player character is in the state of diving falling. In the exemplary embodiment, when the diving falling has started, the game system 1 sets the virtual camera at a position above the player character 201 (specifically, above the player character 201 in the game space) such that the virtual camera faces downward in the game space. This setting is performed by the game system 1 automatically (i.e., without a camera instruction by the player). Therefore, as shown in FIG. 9, when the diving falling has started, a game image showing a game space in which the falling direction of the player character 201 is viewed from a view point behind the player character 201, is displayed on the display 12. This allows the player to intuitively recognize that the player character 201 has entered the state of diving falling. Moreover, the virtual camera is directed to the traveling direction of the player character 201 during the diving falling. This allows the player to easily perform an operation to the player character 201 during the diving falling.

The game image shown in FIG. 9 includes a stamina gauge 206 indicating stamina of the player character 201. In the exemplary embodiment, a parameter indicating stamina is set for the player character 201. For example, the stamina of the player character 201 gradually decreases with the lapse of time while the player character 201 falls in the state of low-velocity falling. For example, the stamina of the player character 201 decreases by a predetermined amount when the player character 201 performs an action of shooting an arrow described later. If the stamina becomes 0 (zero) while the player character 201 falls, the player character 201 transitions to the state of normal falling.

In the exemplary embodiment, during the diving falling, according to an up, down, left, or right movement instruction by the player (e.g., an input instruction performed by tilting the analog stick 32 of the left controller 3), the player character 201 falls while moving forward, backward, leftward, or rightward in the game space (components parallel to a horizontal plane in the game space) with respect to the player character 201 facing downward in the game space (it can be said that the forward direction is substantially the falling direction). Specifically, during the diving falling, the player character 201 performs a downward falling movement while moving with respect to the horizontal direction in the game space. In the exemplary embodiment, the amount of movement per unit time in the horizontal direction during the diving falling is smaller than the amount of movement per unit time in the horizontal direction during the low-velocity falling. That is, the player can cause the player character 201 to move more largely with respect to the horizontal direction during the low-velocity falling than during the diving falling.

The player character 201 in the state of diving falling transitions to the state of normal falling, according to a diving end instruction by the player (e.g., an input instruction performed by pressing the B-button 54 of the right controller 4) (see FIG. 8). The player character 201 in the state of diving falling transitions to the state of low-velocity falling, according to the item use instruction by the player (see FIG. 8).

Moreover, the player character 201 in the state of diving falling transitions to the state of backward falling, according to a turn start instruction by the player (e.g., an input instruction performed by pressing the A-button 53 of the right controller 4) (see FIG. 8).

As shown in FIG. 8, the backward falling is a state where the player character 201 falls in a posture in which the forward direction of the player character 201 is directed upward in the game space and the player character 201 puts its arms down and bends its needs a little (e.g., face-up posture). During the backward falling, the player character 201 falls at the same falling velocity as that of the diving falling.

In the exemplary embodiment, when the backward falling has started, the game system 1 sets the virtual camera at a position beneath the player character 201 (specifically, beneath the player character 201 in the game space) such that the virtual camera faces upward in the game space. This setting is automatically performed by the game system 1. Thus, when the backward falling has started, the virtual camera is set to be directed upward in the game space from behind the player character 201.

As described above, in the exemplary embodiment, while the player character is in the falling state, the game system 1 turns the virtual camera so that the direction of the virtual camera is directed upward in the game space, based on a direction change operation input by the player (e.g., an input for a turn start instruction). This allows the player to easily perform the operation of turning the virtual camera upward, thereby enhancing operability for the game. Furthermore, in the exemplary embodiment, the game system 1 changes the posture of the player character so that the forward direction of the player character is directed upward in the game space, based on the direction change operation input. This allows the player to easily change the posture of the player character, thereby enhancing operability for the player character. Moreover, in the exemplary embodiment, since the posture of the player character and the direction of the virtual camera are changed based on the direction change operation input, the player can intuitively recognize that the posture of the player character has changed, by the change in the direction of the virtual camera.

In the exemplary embodiment, during the backward falling, like the diving falling, the player character 201 moves according to an up, down, left, or right movement instruction performed by the player. That is, according to the up, down, left, or right movement instruction, the player character 201 falls while moving forward, backward, leftward, or rightward in the game space (components parallel to the horizontal plane in the game space) with respect to the player character 201. However, in another embodiment, the game system 1 may inhibit the player to perform a movement control to the player character 201 in the state of backward falling.

The player character 201 in the state of backward falling transitions to the state immediately before the backward falling (specifically, the state of diving falling, or the state of high-velocity falling described later), according to a turn end instruction by the player (e.g., an input instruction performed by pressing the A-button 53 of the right controller 4) (see FIG. 8).

The player character 201 in the state of diving falling transitions to the state of high-velocity falling, according to a high-velocity falling start instruction by the player (e.g., an input instruction performed by pressing the first R-button 60 of the right controller 4) (see FIG. 8). The player character 201 in the state of high-velocity falling transitions to the state of diving falling, according to a high-velocity falling end instruction by the player (e.g., an input instruction performed by releasing the first R-button 60 that has been pressed to start the high-velocity falling) (see FIG. 8).

As shown in FIG. 8, the high-velocity falling is a state where the player character 201 falls with its head downward in the game space while taking a posture as if standing with its arms down and its head being directed to the traveling direction. During the high-velocity falling, the player character 201 falls at a falling velocity higher than that of the normal falling (i.e., at the highest falling velocity among the five falling states).

During the high-velocity falling, like the diving falling, according to an up, down, left, or right movement instruction by the player, the player character 201 falls while moving forward, backward, leftward, or rightward in the game space (components parallel to the horizontal plane in the game space) with respect to the player character 201. However, in the exemplary embodiment, the amount of movement per unit time in the horizontal direction during the high-velocity falling is smaller than the amount of movement per unit time in the horizontal direction during the diving falling. That is, the player can cause the player character 201 to move more largely with respect to the horizontal direction during the diving falling than during the high-velocity falling.

The player character 201 in the state of high-velocity falling transitions to the state of backward falling, according to the turn start instruction by the player (see FIG. 8).

As described above, when the diving falling or the backward falling has started, the position and the direction of the virtual camera are automatically controlled. Meanwhile, during the diving falling, the backward falling, or the high-velocity falling, like the normal falling or the low-velocity falling, the position and the direction of the virtual camera are controlled according to a camera instruction by the player. At this time, the virtual camera is controlled such that the position and the direction thereof allow the player character 201 to be included in the field of view of the virtual camera.

In the exemplary embodiment, when the player character 201 takes a posture corresponding to any one of four falling states (i.e., the aforementioned falling states excluding the normal state), the direction of the player character 201 is controlled according to the direction of the virtual camera.

Figure 10:
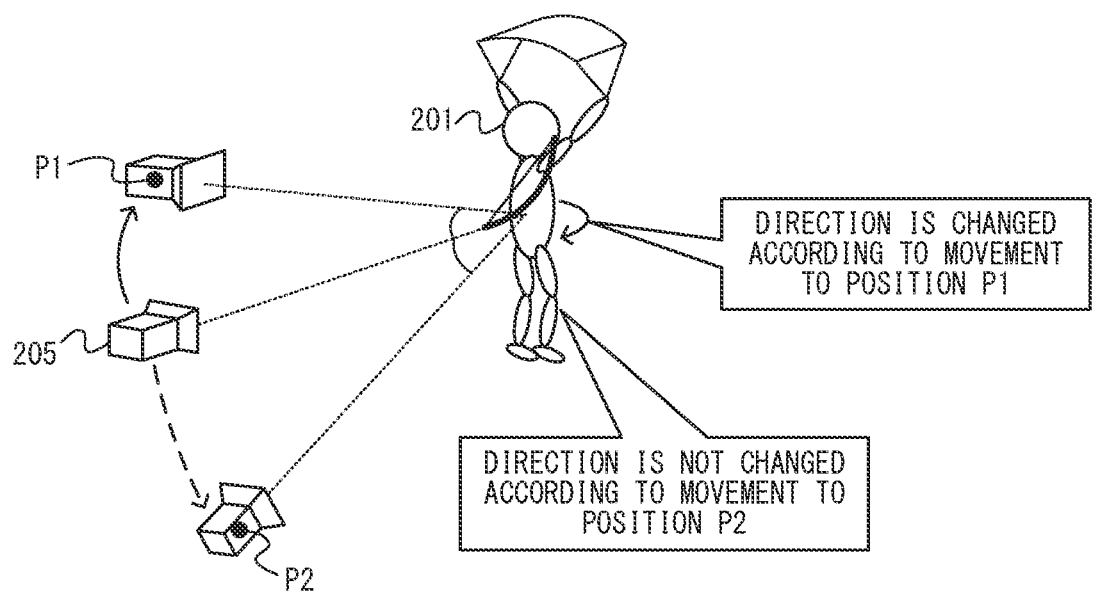
FIG. 10 shows the relationship between change in the direction of a virtual camera and change in the direction of the player character.

FIG. 10 shows the relationship between change in the direction of the virtual camera and change in the direction of the player character. In the exemplary embodiment, when the player character 201 takes one of the postures corresponding to the four falling states, the direction of the player character 201 is controlled according to a yaw direction component, in the game space, of the direction of the virtual camera 205. The yaw direction is a direction of rotation around a rotation axis perpendicular to the horizontal direction in the game space. In the example shown in FIG. 10, when the virtual camera 205 is located behind the player character 201, the virtual camera 205 moves to rotate in the yaw direction around the player character 201, and moves to a position P1, in response to that an input instruction to the left direction is performed. At this time, the direction of the virtual camera 205 also changes in the yaw direction (specifically, the virtual cameral 205 turns right). Thus, according to the change in the direction of the virtual camera 25, the player character 201 turns such that the direction thereof is directed to the line-of-sight direction of the virtual cameral (see an arrow shown in FIG. 10). The direction of the player character 201 may not necessarily be controlled to always coincide with the line-of-sight direction of the virtual camera 205, and may be controlled to follow (i.e., with a certain degree of delay) the line-of-sight direction of the virtual camera 205. Thus, regarding the yaw direction, the direction of the player character 201 is not significantly shifted from the line-of-sight direction of the virtual camera, which enables the player to easily perform an operation of moving the player character 201 (e.g., an operation using the analog stick 32 of the left controller 3).

When the player character 201 takes one of the postures corresponding to the four falling states, even if the direction of the virtual camera 205 changes in the pitch direction in the game space, the direction of the player character 201 is not changed. The pitch direction is a direction of rotation around a rotation axis that is parallel to the horizontal direction in the game space and is perpendicular to the line-of-sight direction of the virtual camera. In the example shown in FIG. 10, when the virtual camera 205 is located behind the player character 201, the virtual camera 205 moves to rotate in the pitch direction around the player character 201, and moves to the position P2, in response to that an input instruction to the down direction is performed. At this time, the direction of the virtual camera 205 also changes in the pitch direction (specifically, the virtual camera 205 turns up). The direction of the player character 201 is not controlled in response to the change in the direction of the virtual camera in the pitch direction. The reason is as follows. Regarding the change in the pitch direction, even if the direction of the player character 201 is shifted from the line-of-sight direction of the virtual camera, the player feels less discomfort regarding an operation of moving the player character 201.

As described above, in the exemplary embodiment, the player performs, to the falling player character 201, a movement instruction or an instruction to change the falling state, thereby controlling the falling direction and/or the falling velocity of the player character 201. In another embodiment, the player may control only one of the falling direction and the falling velocity of the player character 201.

In the exemplary embodiment, when the player character is in the falling state, the game system 1 controls the player character such that the posture of the player character corresponds to at least one of a plurality of postures including: a posture in which an upward direction of the player character (i.e., the upward direction viewed from the player character) is directed downward in the game space (e.g., the posture corresponding to the high-velocity falling); and a posture in which the forward direction of the player character is directed downward in the game space (e.g., the posture corresponding to the diving falling). Moreover, the game system 1 controls at least one of the falling direction and the falling velocity according to the posture of the player character (e.g., the falling velocity is changed between the high-velocity falling and the diving falling). Thus, the posture of the player character that is falling can be diversified, and the player character can be caused to move in the falling direction and/or at the falling velocity according to the posture of the player character.

As for the aforementioned five falling states, the posture of the player character 201, the behavior (e.g., falling velocity) of the player character 201, whether or not a movement operation to the player character 201 is possible, the content of the movement operation, whether or not an operation to the virtual camera is possible, and the content of the operation, are arbitrary, and are not limited to those mentioned above. In another embodiment, the states that the player character 201 can take while it is falling are not limited to the aforementioned five states. In the other embodiment, the player character 201 need not be able to take all the five states. Moreover, in the other embodiment, the conditions for changing the falling state of the player character 201 are arbitrary, and are not limited to the conditions described in the exemplary embodiment.

2-2. Processing in Special Operation Mode

Next, processing in a special operation mode while the player character is falling, will be described. In the exemplary embodiment, the player character 201 can perform a shooting action (in this embodiment, an action of shooting an arrow with a bow) while it is falling. The special operation mode is a process mode for causing the player character 201 to perform an action of shooting an arrow, based on an instruction by the player.

In the exemplary embodiment, the player character 201 takes a ready posture for shooting an arrow (specifically, a posture of holding a bow object 202; see FIG. 13) while it is falling, according to a ready instruction by the player. Moreover, while taking the ready posture, the player character 201 performs an action of shooting an arrow, according to a shooting instruction by the player. While taking the ready posture, the player character 201 ends the ready posture and returns to the posture in the falling state, according to a ready posture end instruction by the player. The special operation mode is started with the ready instruction, and ended with the ready posture end instruction.

In the exemplary embodiment, the ready instruction is an input instruction performed by pressing the ZR-button of the right controller 4, and the shooting instruction is an input instruction performed by releasing the ZR-button having been pressed for the ready instruction. In the exemplary embodiment, the game system 1 starts the special operation mode, in response to that a predetermined key input (e.g., an input to the ZR-button 61) is started by the player while the player character 201 is in the falling state. A shooting operation input for causing the player character 201 to perform the shooting action is an input for ending the predetermined key input that has started the special operation mode. The game system 1 ends the special operation mode, based on an end operation input by the player (e.g., an input for the ready posture end instruction). Thus, the player can start and end the special operation mode through a series of operations such as performing a predetermined key input and ending the key input (e.g., pressing a predetermined button and releasing the button), whereby operability is enhanced.

Figure 11:
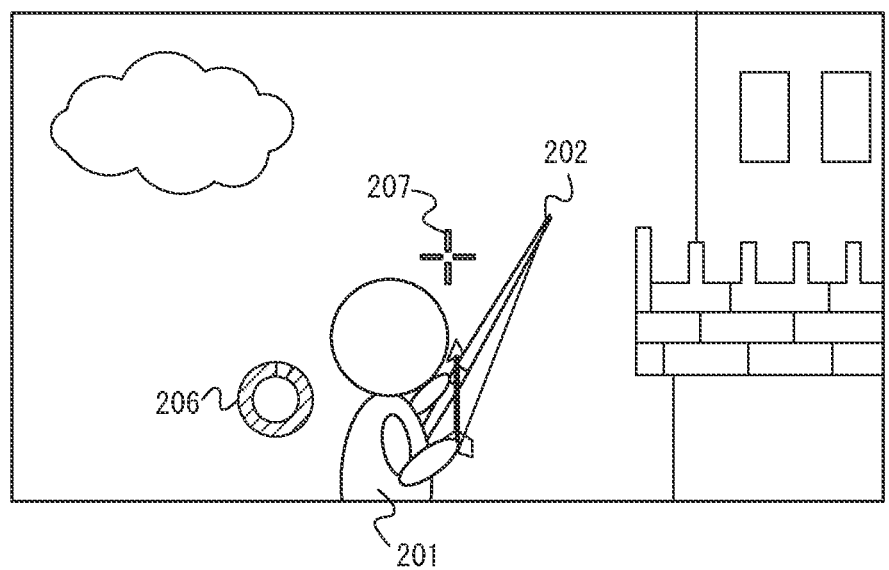
FIG. 11 shows an example of a game image during a special operation mode.

FIG. 11 shows an example of a game image in the special operation mode. As shown in FIG. 11, when the game system 1 is in the special operation mode (i.e., when the player character 201 takes the ready posture), a game image showing a game space in which the player character 201 holding the bow object 202 is viewed from behind, is displayed on the display 12. Moreover, as shown in FIG. 11, the game image includes an aim marker 207. The aim marker 207 indicates an arrow shooting direction when an arrow is shot in response to a shooting instruction performed by the player. In the exemplary embodiment, the aim marker 207 is displayed at a predetermined position (e.g., center position) in the game image showing the game space.

In the exemplary embodiment, even during the special operation mode, the game system 1 receives the camera instruction for operating the virtual camera, as in the case where the game system 1 is not in the special operation mode. Moreover, in the special operation mode, the direction of shooting an arrow by the player character 201 changes in response to that the direction of the virtual camera is changed by the camera instruction. In the exemplary embodiment, the shooting direction is set according to the direction of the virtual camera such that the aim marker 207 is placed at a predetermined position in the game image, regardless of the direction of the virtual camera.

Figure 12:
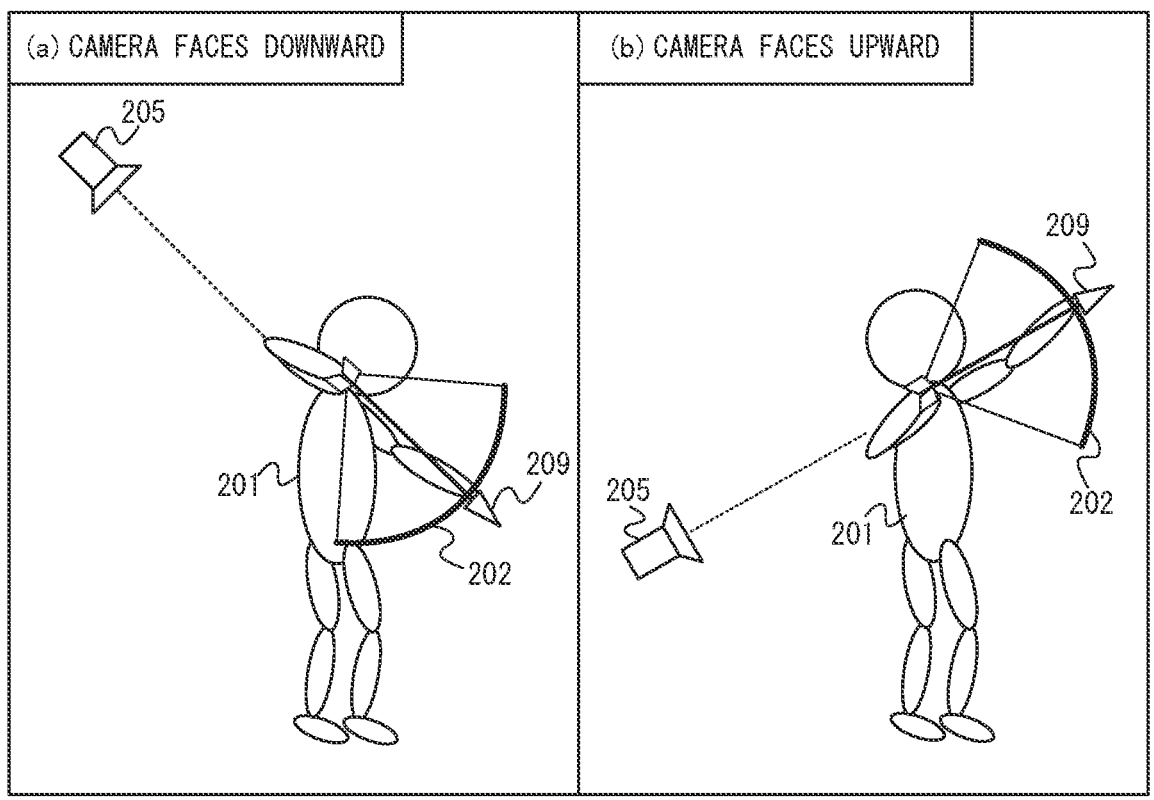
FIG. 12 shows the relationship between change in the direction of the virtual camera and change in the direction of the player character during the special operation mode.

FIG. 12 shows the relationship between change in the direction of the virtual camera during the special operation mode and change in the posture of the player character. As shown in FIG. 12, in the exemplary embodiment, the direction to which the player character 201 points an arrow changes according to change in the direction of the virtual camera. For example, when the line-of-sight direction of the virtual camera is changed to be directed downward relative to the horizontal direction in the game space, the player character 201 points an arrow object 209 downward relative to the horizontal direction (see (a) of FIG. 12). When the line-of-sight direction of the virtual camera is changed to be directed upward relative to the horizontal direction in the game space, the player character 201 points the arrow object 209 upward relative to the horizontal direction (see (b) of FIG. 12). In the exemplary embodiment, the game system 1 controls the motion of the player character 201 such that the line-of-sight direction of the virtual camera coincide with the direction (i.e., shooting direction) of the arrow object 209.

As described above, according to the exemplary embodiment, in the special operation mode, the game system 1 controls the motion of the player character such that the player character takes a posture for a shooting action to a direction according to a component, regarding at least the pitch direction, of the direction of the virtual camera based on a camera operation input (e.g., an input for making a camera instruction). This enables the player character to perform a natural shooting action, and enables the player to easily recognize the shooting direction.

Although FIG. 12 shows the case where the direction of the virtual camera changes in the pitch direction in the game space, the relationship shown in FIG. 12 is also applicable to the case where the direction of the virtual camera changes in the yaw direction in the game space. That is, in the exemplary embodiment, when the direction of the virtual camera changes in the yaw direction in the game space, the game system 1 controls the motion of the player character 201 such that the direction to which the arrow object 209 is pointed is changed in the yaw direction. Thus, it is possible to control the player character 201 to take a natural posture according to the shooting direction, for both the change in the pitch direction and the change in the yaw direction of the direction of the virtual camera.

Figure 14:
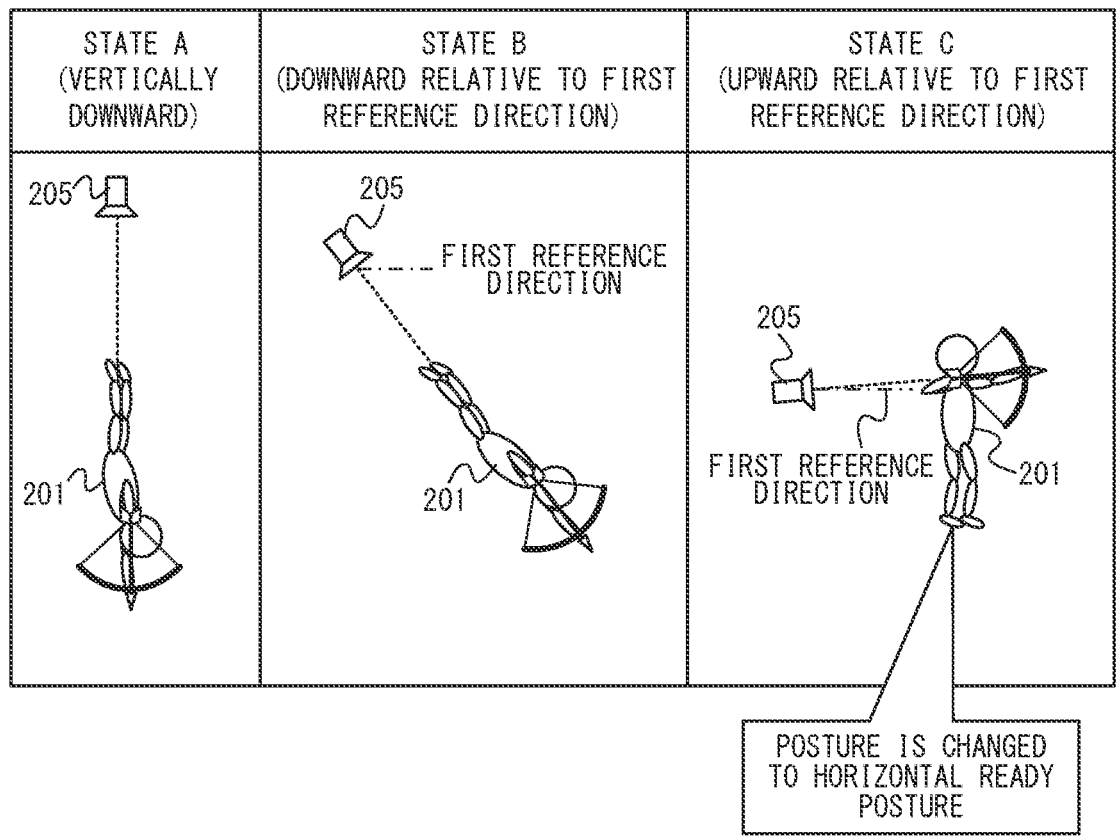
FIG. 14 shows an example of a state where the ready posture of the player character changes from a downward ready posture to a horizontal ready posture.

The motion of changing the direction of the arrow may be a motion of the player character 201 changing its posture (see FIG. 12), or may be a motion of the player character 201 changing (without changing its posture) the direction of the entire player character 201 holding the bow and the arrow (see change from state A to state B shown in FIG. 14). In the exemplary embodiment, when the ready posture of the player character 201 is the horizontal ready posture or the upward ready posture described later, the player character 201 changes its posture (e.g., changes the direction of its upper body) to change the direction of the arrow. Meanwhile, when the ready posture of the player character 201 is a downward ready posture described later, the player character 201 changes the direction of the entire player character 201 holding the bow and the arrow to change the direction of the arrow.

In the exemplary embodiment, in the special operation mode, the game system 1 does not receive a movement instruction for moving the player character 201. That is, in the special operation mode, the player cannot perform a movement operation to the player character 201. In another embodiment, the game system 1 may receive a movement instruction even in the special operation mode.

In the exemplary embodiment, in the special operation mode, a slow display in which motions of objects (excluding a shot arrow object) in the game space become slow, is performed. That is, in the special operation mode, passage of time in the game space is expressed slower than usual (e.g., motions of the objects are expressed at a speed one-tenth (1/10) the speed in the case where the game system 1 is not in the special operation mode). Therefore, on the display, the player character 201 falls slowly, and the other objects, excluding the shot arrow object, also move slowly. This enables the player to easily aim at a target by using the aim marker 207 while the player character 201 is falling, and easily perform an operation of causing the player character 201 to shoot an arrow.

As described above, in the exemplary embodiment, the game system 1, in the special operation mode, displays an animation showing the state where the player character 201 appears to fall at a falling velocity lower than that in the case where the game system 1 is not in the special operation mode. Thus, operability of the operation of causing the player character 201 to perform the shooting action can be enhanced.

In the exemplary embodiment, the game system 1, in the special operation mode, performs a display process in which the speed of the entire game space is reduced. That is, in the special operation mode, not only the falling velocity of the player character 201 but also the moving velocities of the other objects present in the game space are reduced. In another embodiment, the game system 1, in the special operation mode, may reduce only the falling velocity of the player character 201 without changing the moving velocities of the other objects present in the game space. Also in this case, operability of the operation of causing the player character 201 to perform the shooting action can be enhanced as in the exemplary embodiment.

In the exemplary embodiment, the game system 1, in the special operation mode, changes the direction to which the player character 201 points an arrow, according to the direction of the virtual camera, and if a condition is satisfied, changes the ready posture (specifically, the type of the ready posture). In the special operation mode, the player character 201 can take three types of ready postures as follows.

horizontal ready posture
  downward ready posture
  upward ready posture

The game system 1 determines a posture that the player character 201 should take from among the three types of ready postures, according to the direction of the virtual camera.

Figure 13:
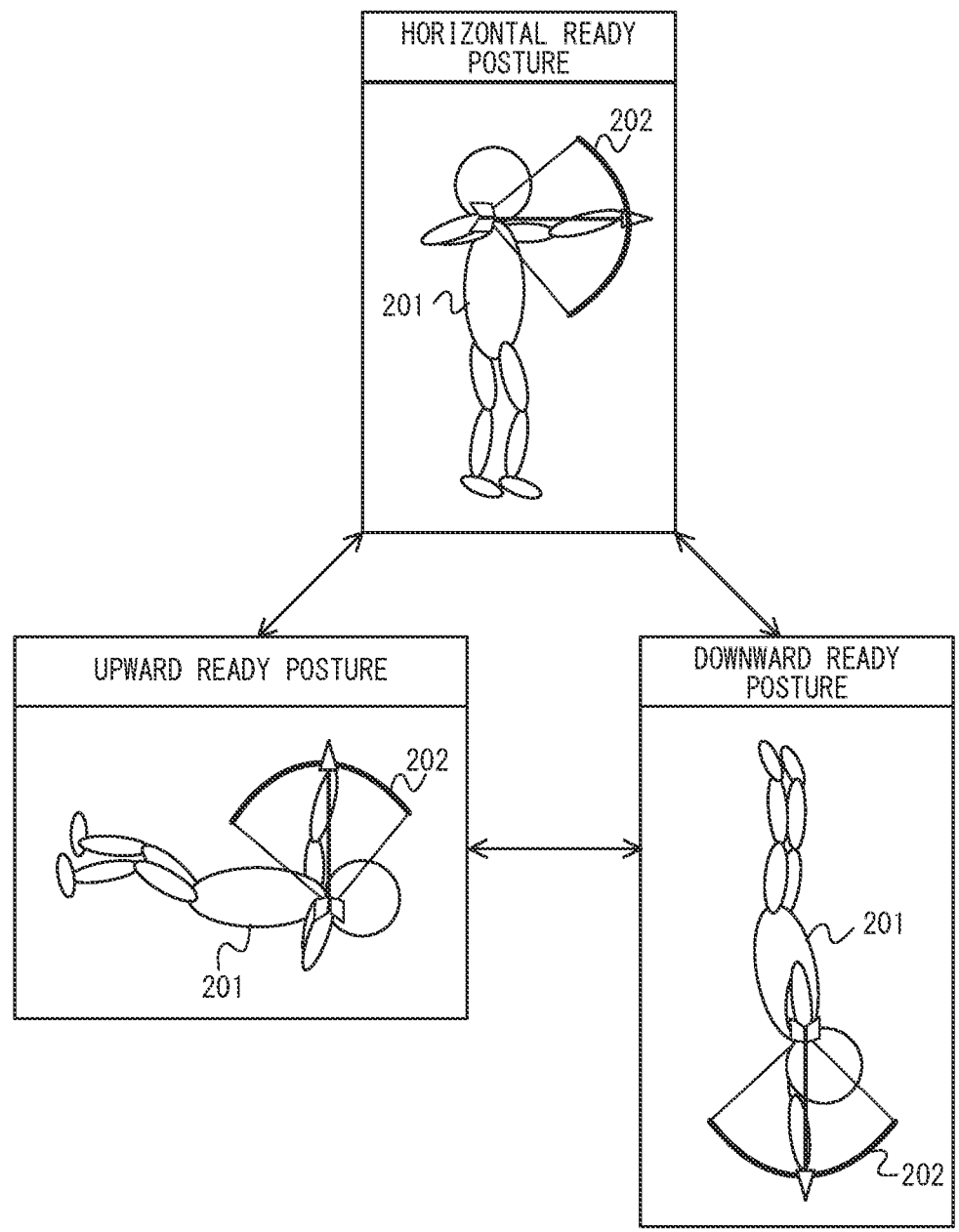
FIG. 13 shows an example of three types of ready postures that the player character can take.

FIG. 13 shows an example of the three types of ready postures that the player character can take. As shown in FIG. 13, the horizontal ready posture is a posture that the player character 201 can take when the shooting direction is substantially horizontal. Specifically, the horizontal ready posture is a posture in which the player character 201, in a standing position, holds the bow object 202 toward the forward direction thereof. When taking the horizontal ready posture, the player character 201 is directed with its head upward in the game space. In the exemplary embodiment, if the special operation mode is started during the normal falling, the low-velocity falling, or the diving falling described above, the game system 1 controls the player character 201 to take the horizontal ready posture.

As shown in FIG. 13, the downward ready posture is a posture that the player character 201 can take when the shooting direction is substantially downward. Specifically, the downward ready posture is a posture in which the player character 201 holds the bow object 202 toward the traveling direction (i.e., falling direction). When taking the downward ready posture, the player character 201 is directed with its head downward in the game space. In the exemplary embodiment, if the special operation mode is started during the high-velocity falling, the game system 1 controls the player character 201 to take the downward ready posture.

As shown in FIG. 13, the upward ready posture is a posture that the player character 201 can take when the shooting direction is substantially upward. Specifically, the upward ready posture is a posture in which the player character 201 holds the bow object 202 toward the forward direction thereof with its knees being bent a little. When the player character 201 takes the upward ready posture, the forward direction of the player character 201 is directed upward in the game space (e.g., face-up posture). In the exemplary embodiment, if the special operation mode is started during the backward falling, the game system 1 controls the player character 201 to take the upward ready posture.

In the exemplary embodiment, since the player character 201 can take the three types of ready postures, it is possible to control the motion of the player character 201 so as to take a natural ready posture regardless of whichever direction in the game space the shooting direction is. Moreover, according to the exemplary embodiment, the range of the shooting direction can be increased while causing the player character 201 to take a natural ready posture.

In the exemplary embodiment, in the special operation mode, the game system 1 sets the posture of the player character at the start of the special operation mode, according to the posture immediately before the start of the special operation mode. For example, if the posture of the player character immediately before the start of the special operation mode is the posture in which the upward direction of the player character is directed upward in the game space (e.g., the posture of normal falling or low-velocity falling), the game system 1 sets the posture at the start of the special operation mode to the posture in which the upward direction of the player character is directed upward in the game space. Meanwhile, if the posture of the player character immediately before the start of the special operation mode is the posture in which the upward direction of the player character is directed downward in the game space (e.g., the posture of high-velocity falling), the game system 1 sets the posture at the start of the special operation mode to the posture in which the upward direction of the player character is directed downward in the game space. Thus, in the exemplary embodiment, the ready posture after the transition to the special operation mode varies depending on the falling state of the player character 201 immediately before the transition to the special operation mode. Thus, the behavior of the posture change of the player character 201 at the transition to the special operation mode can be made natural.

In the exemplary embodiment, during the special operation mode, the ready posture of the player character 201 changes among the aforementioned three types of ready postures. Specifically, during the special operation mode, the game system 1 may change the ready posture of the player character 201 from the horizontal ready posture to the downward ready posture or the upward ready posture (see FIG. 13). Meanwhile, during the special operation mode, the game system 1 may change the ready posture of the player character 201 from the downward ready posture or the upward ready posture to the horizontal ready posture (see FIG. 13). Hereinafter a process of changing the ready posture among the three types of ready postures will be described in detail.

FIG. 14 shows an example of a state where the ready posture of the player character changes from the downward ready posture to the horizontal ready posture. In FIG. 14, state A is a state where the player character 201 takes the downward ready posture, and the virtual camera 205 faces vertically downward. Therefore, in the state A, the direction to which the player character 201 points the arrow is vertically downward according to the direction of the virtual camera 205.

In FIG. 14, state B is a state where the direction of the virtual camera is changed in the pitch direction (specifically, upward) from the state A. In the state B, the direction to which the player character 201 points the arrow is also changed according to the direction of the virtual camera 205, and is upward relative to that in the state A. In the state B, the direction of the virtual camera 205 is downward relative to a first reference direction. At this time, the player character 201 takes the downward ready posture. In the exemplary embodiment, the first reference direction is a direction parallel to the horizontal direction.

In FIG. 14, state C is a state where the direction of the virtual camera is further changed upward from the state B, and is upward relative to the first reference direction. In the state C, the ready posture of the player character 201 is changed from the downward ready posture to the horizontal ready posture. That is, the game system 1 changes the ready posture of the player character 201 from the downward ready posture to the horizontal ready posture, in response to that the direction of the virtual camera 205 is changed upward relative to the first reference direction. At this time, the direction of the player character 201 (specifically, the direction of the body of the player character 201) viewed from the virtual camera 205 changes. That is, when the player character 201 takes the downward ready posture, the lower side of the body of the player character 201 is directed toward the virtual camera 205. Meanwhile, when the player character 201 takes the horizontal ready posture, the rear side of the body of the player character 201 is directed toward the virtual camera 205. This allows the player to easily recognize that the ready posture is changed.

As described above, according to the exemplary embodiment, in the special operation mode, the game system 1 changes the posture of the player character 201 such that the upward direction of the player character 201 is directed upward in the game space (e.g., the horizontal ready posture) in response to that a component, in the pitch direction, of the direction of the virtual camera 205 is changed from a state of being downward relative to the first reference direction (e.g., the state B shown in FIG. 14) to a state of being upward relative to the first reference direction (e.g., the state C in FIG. 14). Thus, the game system 1 can change the arrow shooting direction from the vertically downward direction to the horizontal direction while keeping the posture of the player character 201 natural. Moreover, the posture of the player character 201 having been changed enables the player to recognize that the direction of the virtual camera has become upward relative to the reference (i.e., the first reference direction). Thus, the player can easily recognize to which direction the shooting direction is pointed in the game space.

Figure 15:
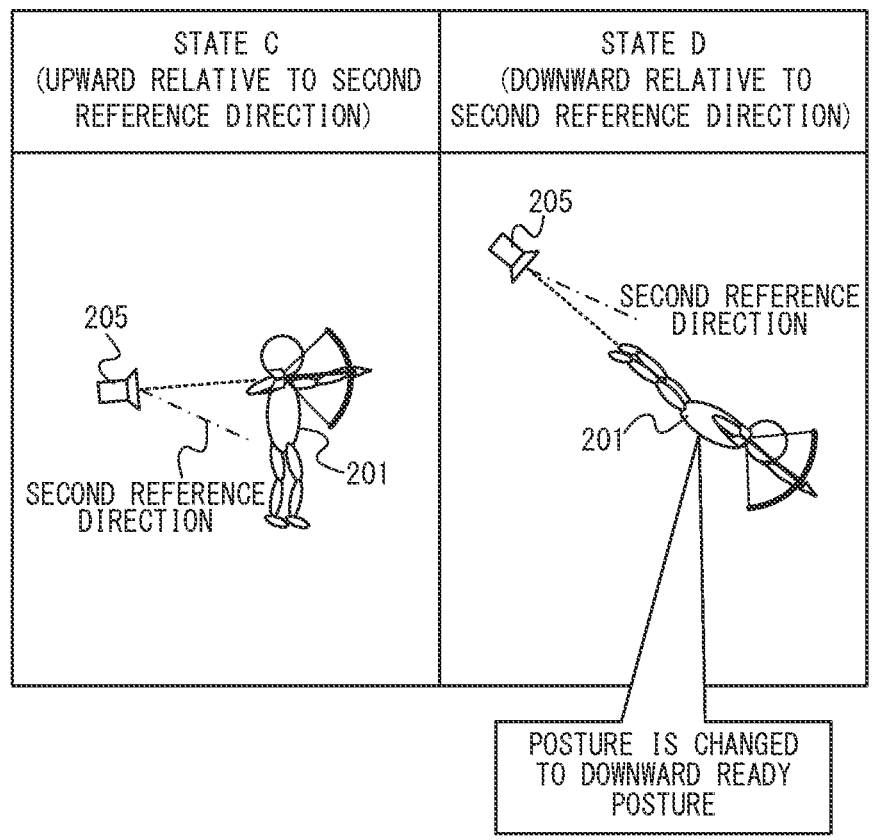
FIG. 15 shows an example of a state where the ready posture of the player character changes from the horizontal ready posture to the downward ready posture.

FIG. 15 shows an example of a state where the ready posture of the player character changes from the horizontal ready posture to the downward ready posture. The state C in FIG. 15 is the same as the state C shown in FIG. 14, in which the player character 201 takes the horizontal ready posture, and the direction of the virtual camera 205 is a little upward relative to the horizontal direction.

In FIG. 15, state D is a state where the direction of the virtual camera 205 is changed downward from the state C. In the state D, the direction to which the player character 201 points the arrow is also changed according to the direction of the virtual camera 205, and is more downward than that in the state C. In the state D, the direction of the virtual camera 205 is downward relative to a second reference direction. In the state D, the ready posture of the player character 201 is changed from the horizontal ready posture to the downward ready posture. That is, the game system 1 changes the ready posture of the player character 201 from the horizontal ready posture to the downward ready posture in response to that the direction of the virtual camera 205 is changed downward relative to the second reference direction. For example, when the player character 201 takes the posture of the state C, it is difficult to cause the player character 201 to take a posture of directing the arrow vertically downward. However, it is easy to cause the player character 201 to take a posture of directing the arrow downward by changing the posture thereof to the state D.

As described above, according to the exemplary embodiment, in the special operation mode, the game system 1 changes the posture of the player character 201 such that the upward direction of the player character 201 is directed downward in the game space (e.g., the downward ready posture) in response to that a component, in the pitch direction, of the direction of the virtual camera 205 is changed from a state of being upward relative to the second reference direction (e.g., the state D in FIG. 14) to a state of being downward relative to the second reference direction (e.g., the state C in FIG. 15). Thus, the game system 1 can change the arrow shooting direction from the horizontal direction to the downward direction while keeping the ready posture of the player character 201 natural. Moreover, the posture of the player character 201 having been changed enables the player to recognize that the direction of the virtual camera has become downward relative to the reference (i.e., the second reference direction). Thus, the player can easily recognize to which direction the shooting direction is pointed in the game space. In another embodiment, the posture having been changed may be a posture in which the forward direction of the player character 201 is directed downward in the virtual space (e.g., face-down posture).

In the exemplary embodiment, the first reference direction is the horizontal direction while the second reference direction is a little downward relative to the horizontal direction (i.e., the angle of the second reference direction with respect to the horizontal direction is a depression angle). That is, the first reference direction is set to be upward relative to the second reference direction. This reduces the risk of an unnatural motion such that the posture of the player character 201 is frequently switched between the downward ready posture and the horizontal ready posture due to the direction of the virtual camera being frequently switched across the reference direction.

In another embodiment, the first reference direction and the second reference direction may be the same direction.

As described above, according to the exemplary embodiment, the game system 1, in the special operation mode, changes the ready posture of the player character (i.e., changes the type of ready posture) as a change in the posture of the player character according to a component, regarding at least the pitch direction, of the direction of the virtual camera. This allows the player character to take a natural ready posture according to the shooting direction.

While switching between the horizontal ready posture and the downward ready posture of the player character 201 in the special operation mode has been described, switching between the horizontal ready posture and the upward ready posture is similarly performed. That is, the game system 1 changes the posture of the player character 201 from the horizontal ready posture to the upward ready posture, in response to that a component, in the pitch direction, of the direction of the virtual camera 205 is changed from a state of being downward relative to a third reference direction to a state of being upward relative to the third reference direction. The third reference direction is, for example, upward relative to the horizontal direction (i.e., the angle of the third reference direction with respect to the horizontal direction is an elevation angle). Moreover, the game system 1 changes the posture of the player character 201 from the upward ready posture to the horizontal ready posture, in response to that the component, in the pitch direction, of the direction of the virtual camera 205 is changed from a state of being upward relative to a fourth reference direction to a state of being downward relative to the fourth reference direction. The fourth reference direction is set to be upward relative to the horizontal direction, and downward relative to the third reference direction. Thus, the same effect as that of the switching between the horizontal ready posture and the downward ready posture can be achieved for the switching between the horizontal ready posture and the upward ready posture. In another embodiment, the first reference direction and the second reference direction may be the same direction.

In the exemplary embodiment, the ready posture of the player character 201 is also changed by the turn start instruction or the turn end instruction performed by the player. Specifically, when the ready posture of the player character is the horizontal ready posture or the downward ready posture, the ready posture of the player character 201 is changed to the upward ready posture according to the turn start instruction by the player (see FIG. 13). Meanwhile, when the ready posture of the player character is the upward ready posture, the ready posture of the player character 201 is changed to the ready posture (specifically, the horizontal ready posture or the downward ready posture) immediately before the upward ready posture, according to the turn end instruction by the player.

During the special operation mode, the player character 201 performs the shooting action in response to that the shooting instruction has been performed. That is, the player character 201 performs an action of shooting an arrow, whereby an arrow object flies (i.e., moves) in the shooting direction. When the shooting action has been performed, the game system 1 decreases the stamina of the player character 201 by a predetermined amount. If the stamina becomes 0 in the middle of the special operation mode, the game system 1 ends the special operation mode, and sets the player character 201 in the state of normal falling. That is, in the exemplary embodiment, the special operation mode is ended not only by the ready posture end instruction but also by the stamina of the player character 201 having become 0.

In the exemplary embodiment, if the special operation mode is ended by the ready posture end instruction while the player character 201 takes the horizontal ready posture in the special operation mode, the player character 201 enters the state of normal falling. Meanwhile, if the special operation mode is ended by the ready posture end instruction while the player character 201 takes the downward ready posture in the special operation mode, the player character 201 enters the state of high-velocity falling. If the special operation mode is ended by the ready posture end instruction while the player character 201 takes the upward ready posture in the special operation mode, the player character 201 enters the state of backward falling. Thus, the behavior of the posture change of the player character 201 before and after the end of the special operation mode can be made natural.

As described above, in the exemplary embodiment, the player character 201 can take a plurality of types of ready postures in the special operation mode, and the game system 1 changes the type of the ready posture according to the direction of the virtual camera. Thus, the range of the shooting direction can be increased while causing the player character 201 to take a natural ready posture.

When the player character 201 is in the air, the ground may not come into view of the player. In this case, it may be difficult for the player to recognize to which direction the player character 201 is directed in the game space because, for example, nothing is present around the player character 201. Therefore, when the player character 201 is in the air, the player may lose sight of the direction to which the shooting direction is directed in the game space. In contrast, according to the exemplary embodiment, since the posture (specifically, ready posture) of the player character is changed according to the direction of the virtual camera, the player can roughly recognize the up-down direction of the game space by the posture of the player character. Thus, the possibility that the player loses sight of the shooting direction can be reduced.

3. Specific Example of Processing in Game System

Next, a specific example of information processing in the game system 1 will be described with reference to FIGS. 16 to 19.

Figure 16:
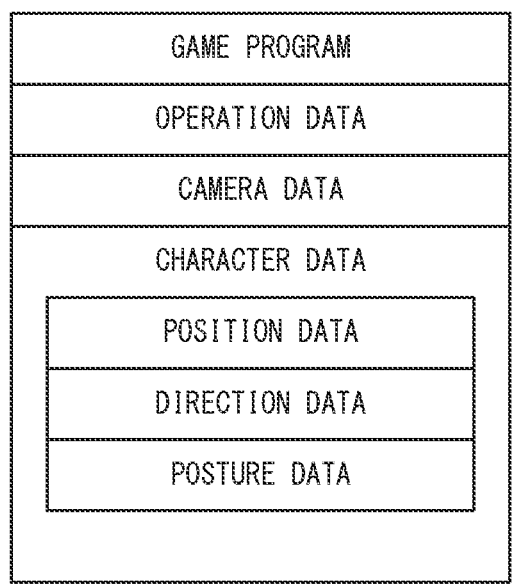
FIG. 16 shows an example of various data used for information processing in a non-limiting game system.

FIG. 16 shows an example of various data to be used for the information processing in the game system 1. The various data shown in FIG. 16 are stored in a storage medium (e.g., the flash memory 84, the DRAM 85, and/or a memory card attached to the slot 23) that is accessible by the main body apparatus 2.

As shown in FIG. 16, the game system 1 stores therein a game program. The game program is a program for executing a game (specifically, game control processing shown in FIG. 17) according to the exemplary embodiment. The game system 1 stores therein operation data, camera data, and character data.

The operation data is transmitted from the controllers 3 and 4 to the main body apparatus 2 and stored in the main body apparatus 2 as described above. In the exemplary embodiment, the operation data includes input data indicating inputs to the respective input sections described above. The camera data indicates information regarding a virtual camera set in a virtual game space (e.g., information indicating the position, the direction, etc., of the virtual camera).

The character data indicates information regarding a player character placed in the game space. In the exemplary embodiment, the character data includes position data, direction data, and posture data. The position data indicates the position of the player character in the game space. The direction data indicates the direction of the player character in the game space. The posture data indicates the postures of the player character (specifically, the postures in the falling states, the ready postures, etc.). The character data may include data indicating various parameters (e.g., stamina) set on the player character, in addition to the aforementioned data.

Figure 17:
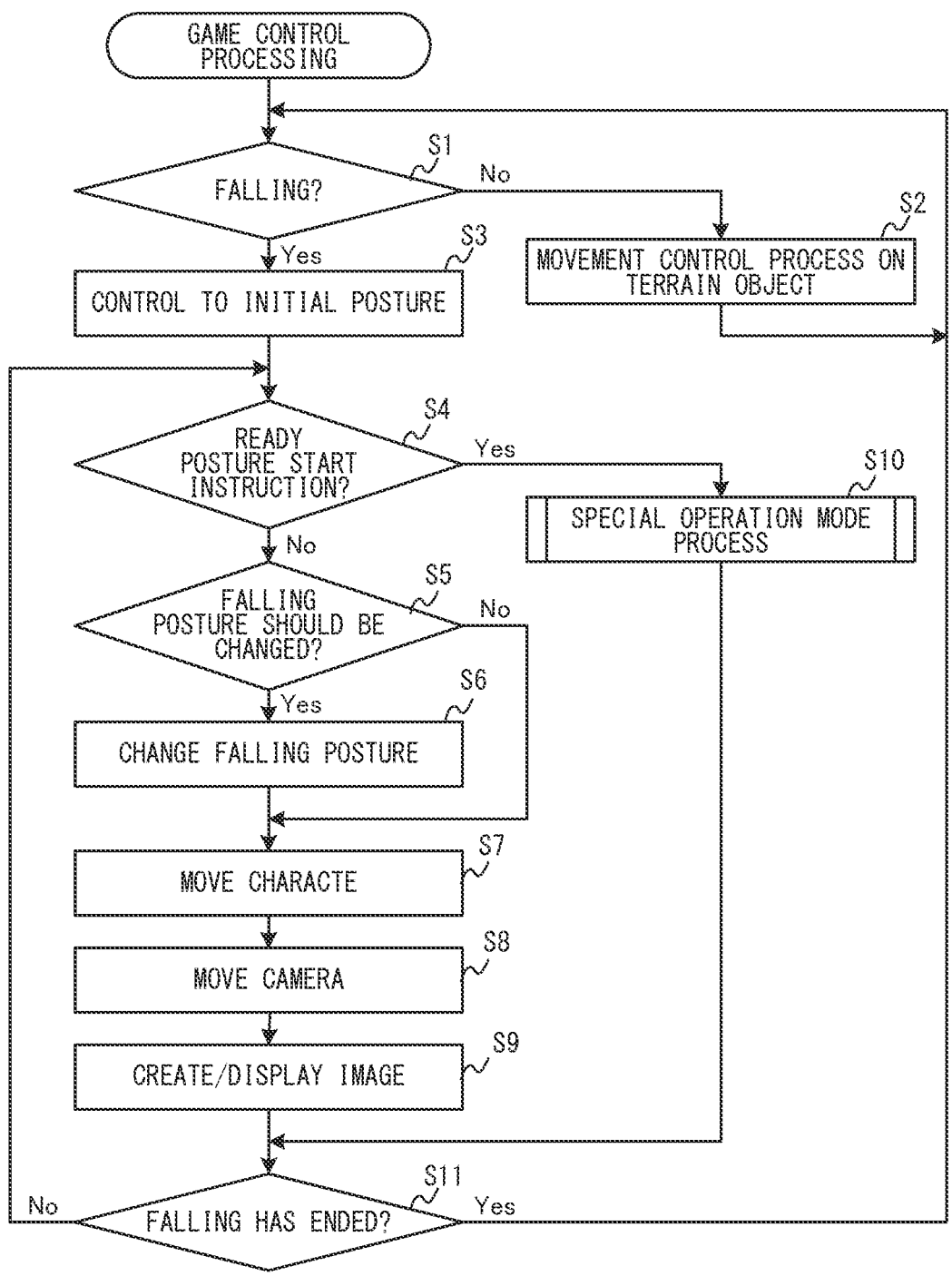
FIG. 17 is a flowchart showing an example of a flow of game control processing executed by the non-limiting game system.

FIG. 17 is a flowchart showing an example of a flow of game control processing executed by the game system 1. The game control processing shown in FIG. 17 is started in response to that the player character 201 is placed in the game space during execution of the game program. Although not shown in FIG. 17, the game control processing is ended when a menu screen is displayed by an instruction of the user or when the game is ended by an instruction of the user.

In the exemplary embodiment, the processor 81 of the main body apparatus 2 executes the game program stored in the game system 1, thereby executing processes in steps shown in FIG. 17. However, in another embodiment, a part of the processes in the steps may be executed by a processor (e.g., a dedicated circuit or the like) other than the processor 81. If the game system 1 is communicable with another information processing apparatus (e.g., a server), a part of the processes in the steps shown in FIGS. 17 to 19 may be executed by the information processing apparatus. The processes in the steps shown in FIGS. 17 to 19 are merely examples, and the processing order of the steps may be changed or other processes may be executed in addition to (or instead of) the processes in the steps, so long as similar results can be obtained.

Figure 18:
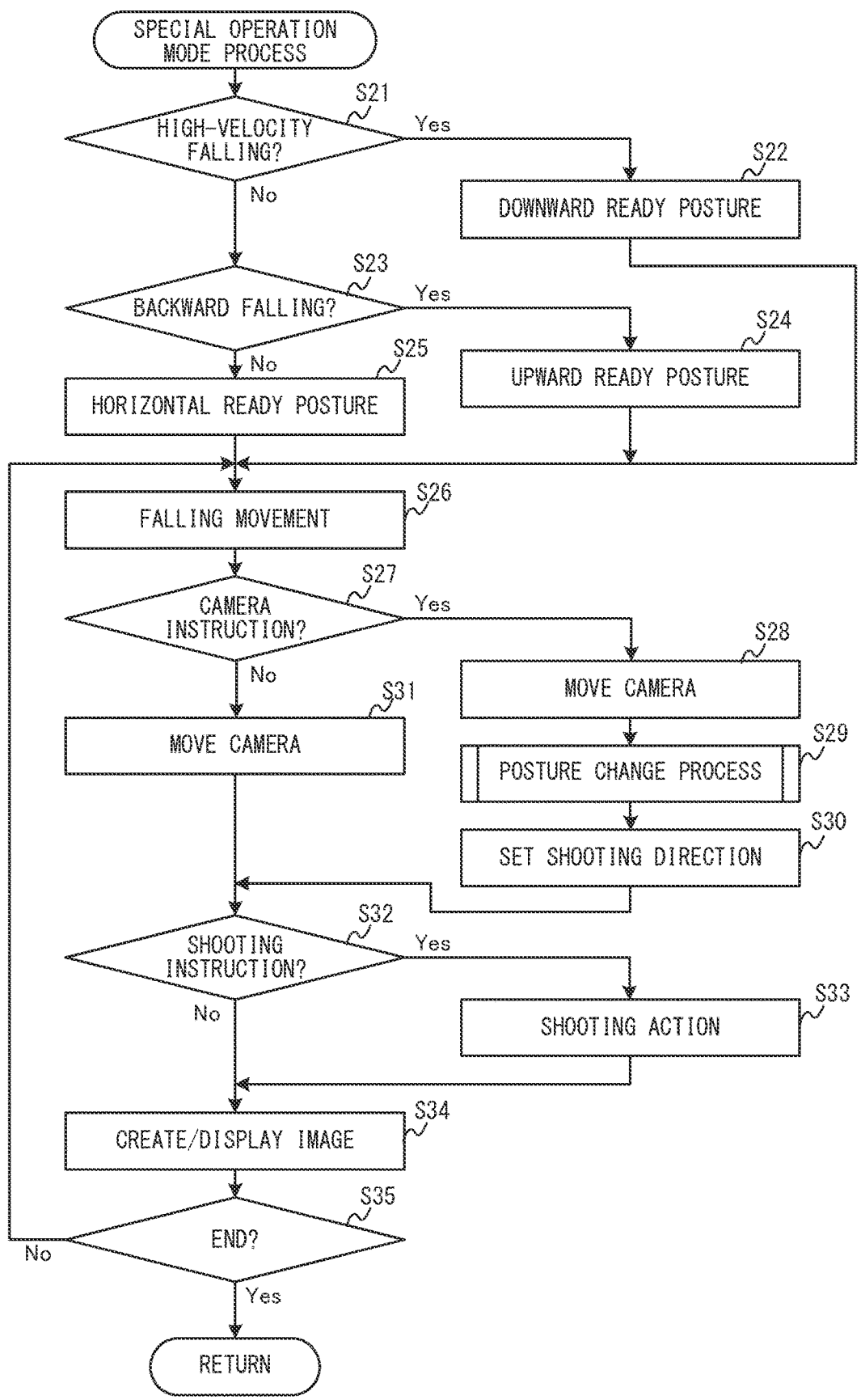
FIG. 18 is a sub-flowchart showing an example of a specific flow of a special operation mode process in step S9 shown in FIG. 17.

The processor 81 executes the processes in the steps shown in FIGS. 17 to 19 by using a memory (e.g., the DRAM 85). That is, the processor 81 stores, in the memory, information (in other words, data) obtained in each process step, and reads out the information from the memory when using the information in the subsequent process steps.

In step S1 shown in FIG. 17, the processor 81 determines whether or not the player character is in the falling state. For example, the processor 81 determines that the player character is in the falling state, when the player character is in the air and is falling toward the ground from a place of a predetermined height or more. Meanwhile, the processor 81 determines that the player character is not in the falling state, when the player character is in contact with the ground, or when the player character is in the air and is falling toward the ground from a place lower than the predetermined height. When the determination result in step S1 is negative, the process in step S2 is executed. When the determination result in step S1 is positive, the process in step S3 is executed.

In step S2, the processor 81 executes a control process for causing the player character to move on a terrain object. For example, the processor 81 causes the player character to perform a motion of moving (e.g., walking or running) on the terrain object, according to a direction input to the controller (e.g., a direction input to the analog stick 32). At this time, the processor 81 updates the character data stored in the memory so as to indicate the content after the motion control of the player character. Moreover, in step S2, the processor 81 creates a game image showing a game space after the control process, and displays the game image on the display 12. The process in step S2 may be the same as the conventional game control process. The game system 1 may execute a process of controlling the movements of other objects such as a virtual camera, an enemy object, etc., in addition to executing the process of controlling the movement of the player character. Next to step S2, the process in step S1 is executed again.

A process loop of steps S1 and S2 is executed once every predetermined time (e.g., every frame time). That is, in the exemplary embodiment, the processor 81 performs the determination in step S1 once every predetermined time.

In step S3, the processor 81 determines an initial posture of falling, and controls the motion of the player character so that the player character takes the determined posture. As described above, in the exemplary embodiment, when the player character falls from a height without performing a jumping action, the processor 81 sets the posture of normal falling as the initial posture. On the other hand, when the player character falls from a height after performing a jumping action, the processor 81 sets the posture of diving falling as the initial posture. At this time, the processor 81 updates the content of the posture data stored in the memory so as to indicate the set posture. Next to step S3, the process in step S4 is executed.

In step S4, the processor 81 determines whether or not a ready posture start instruction has been performed by the player. When the determination result in step S4 is positive, the process in step S10 described later is executed. When the determination result in step S4 is negative, the process in step S5 is executed.

In step S5, the processor 81 determines whether or not to change the posture of the falling player character. Specifically, the processor 81 determines whether or not an instruction to change the posture of the falling player character (e.g., an item use instruction, a diving instruction, etc.) has been performed by the player, and whether or not the stamina of the player character has become 0. When the instruction has been performed or when the stamina of the player character has become 0, the processor 81 determines to change the posture of the falling player character. On the other hand, when the instruction has not been performed and the stamina of the player character is not 0, the processor 81 determines not to change the posture of the falling player character. When the determination result in step S5 is positive, the process in step S6 is executed. When the determination result in step S5 is negative, the process in step S6 is skipped and the process in step S7 is executed.

During the game control processing, the processor 81 determines whether or not various instructions have been performed by the player, based on the operation data acquired from the controller 3 or 4. Here, the processor 81 acquires, at an appropriate timing, the operation data received from each controller via the controller communication section 83 and/or the terminals 17 and 21, and stores the operation data in the memory. Based on the acquired operation data, the processor 81 determines, at an appropriate timing, whether or not an instruction has been performed by the player. When an instruction has been performed, the processor 81 specifies the content of the instruction.

In step S6, the processor 81 changes the posture of the falling player character. The posture after the change is determined according to the method described in the above "[2-1. Posture during falling]". That is, when it is determined in step S5 that the instruction to change the posture has been performed by the player, the processor 81 controls the player character to take the posture according to the instruction. Alternatively, when it is determined in step S5 that the stamina of the player character has become 0, the processor 81 controls the player character to take the posture of normal falling. At this time, the processor 81 updates the content of the posture data stored in the memory so as to indicate the posture having been changed. Next to step S6, the process in step S7 is executed.

In step S7, the processor 81 causes the player character to move (here, to fall) in the game space. The movement of the player character is controlled by the method described in the above "[2-1. Posture during falling]". That is, the processor 81 causes the player character to move in the gravity direction (i.e., vertical downward direction) in the game space, and when a movement instruction has been performed by the player, causes the player character to move in the direction according to the movement instruction. Moreover, when a movement instruction and/or a camera instruction have been performed by the player, the processor 81 changes the direction of the player character according to the instructions. At this time, the processor 81 updates the content of the position data stored in the memory so as to indicate the position of the player character having been moved, and updates the content of the direction data stored in the memory so as to indicate the direction of the player character having been moved. When the player character is in the state of low-velocity falling, the processor 81 decreases the stamina of the player character by a predetermined amount according to the lapse of time while the player character is falling. Next to step S7, the process in step S8 is executed.

In step S7, the processor 81 may control, according to need, motions of objects (e.g., an enemy object, a shot arrow object, etc.) other than the player character in the game space.

In step S8, the processor 81 causes the virtual camera in the game space to move. The movement of the virtual camera is controlled by the method described in the above "[2-1. Posture during falling]". That is, the processor 81 changes the position and the direction of the virtual camera according to a camera instruction performed by the player. As described above, the virtual camera is controlled such that the position and the direction thereof allow the player character 201 to be included in the field of view of the virtual camera. Therefore, in step S8, when a camera instruction has not been performed by the player, the processor 81 changes the position of the virtual camera so as to move downward according to falling of the player character. Meanwhile, when the diving falling or the backward falling has been started, (i.e., when, in step S6, the posture of the player character has been changed to the posture of diving falling or backward falling), the processor 81 sets the virtual camera to be directed to a predetermined direction. In step S8, the processor 81 updates the content of the camera data stored in the memory so as to indicate the position and the direction of the virtual camera having been moved. Next to step S8, the process in step S9 is executed.

In step S9, the processor 81 creates a game image showing a game space, and displays the game image on the display 12. This game image is creased based on the character data and the camera data updated in steps S6 to S8. That is, the processor 81 creates the game image such that the game space indicating the position, direction, and posture of the player character which are changed in steps S6 and S7 is viewed in a direction based on the direction of the virtual camera from the position of the virtual camera that is set in step S8. The game image creating process in step S9 is repeatedly executed once every predetermined time (e.g., every frame time). That is, the process loop of steps S4 to S11 is repeatedly executed once every predetermined time, excluding a case where the process of step S10 described below is executed. A display device on which the game image is displayed may be the display 12 of the main body apparatus 2, or the stationary monitor connected to the main body apparatus 2. Next to step S9, the process in step S11 is executed.

Meanwhile, in step S10, the processor 81 executes a special operation mode process that is a process to be executed in the special operation mode. The special operation mode process will be described later in detail (see FIG. 18). Next to step S10, the process in step S11 is executed.

In step S11, the processor 81 determines whether or not falling of the player character has ended. For example, the processor 81 determines whether or not the player character has come into contact with a terrain object such as the ground. When the determination result in step S11 is positive, the process in step S1 is executed again. When the determination result in step S11 is negative, the process in step S4 is executed. Thereafter, a series of processes in steps S4 to S11 is repeatedly executed until it is determined in step S11 that falling of the player character has ended.

FIG. 18 is a sub-flowchart showing an example of a specific flow of the special operation mode process in step S9 shown in FIG. 17. In the special operation mode process, firstly, in step S21, the processor 81 determines whether or not the falling state of the player character immediately before the start of the special operation mode process was the high-velocity falling, based on the posture data stored in the memory. When the determination result in step S21 is positive, the process in step S22 is executed. When the determination result in step S21 is negative, the process in step S23 is executed.

In step S22, the processor 81 controls the motion of the player character so that the player character takes the downward ready posture. That is, the processor 81 updates the content of the posture data stored in the memory so as to indicate the downward ready posture. Next to step S22, the process in step S26 is executed.

In step S23, the processor 81, based on the posture data stored in the memory, determines whether or not the falling state of the player character immediately before the start of the special operation mode process was the backward falling. When the determination result in step S23 is positive, the process in step S24 is executed. When the determination result in step S23 is negative, the process in step S25 is executed.

In step S24, the processor 81 controls the motion of the player character so that the player character takes the upward ready posture. That is, the processor 81 updates the content of the posture data stored in the memory so as to indicate the upward ready posture. Next to step S24, the process in step S26 is executed.

In step S25, the processor 81 controls the motion of the player character so that the player character takes the horizontal ready posture. Here, the process in step S25 is executed when the falling state of the player character immediately before the start of the special operation mode process was the normal falling, the low-velocity falling, or the diving falling. Therefore, the processor 81 updates the content of the posture data stored in the memory so as to indicate the horizontal ready posture. Next to step S25, the process in step S26 is executed.

In step S26, the processor 81 causes the player character to move (here, to fall) in the game space. That is, the processor 81 causes the player character to move in the gravity direction (i.e., vertical downward direction) in the game space. At this time, the processor 81 updates the content of the position data stored in the memory so as to indicate the position of the player character having been moved. Next to step S26, the process in step S27 is executed.

In step S26, the processor 81 may control, according to need, motions of objects (e.g., an enemy object, a shot arrow object, etc.) other than the player character in the game space.

In step S27, the processor 81 determines whether or not a camera instruction has been performed by the player. When the determination result in step S27 is positive, the process in step S28 is executed. When the determination result in step S27 is negative, the process in step S31 is executed.

In step S28, the processor 81 causes the virtual camera to move in the game space according to the camera instruction by the player. Movement of the virtual camera is controlled according to the method described in the above "[2. Outline of processing in game system]". Next to step S28, the process in step S29 is executed.

In step S29, the processor 81 executes a posture change process. The posture change process is a process of changing the ready posture (specifically, the type of ready posture) of the player character, according to the direction of the virtual camera. Hereinafter, the posture change process will be described in detail with reference to FIG. 19.

FIG. 19 is a sub-flowchart showing an example of a specific flow of the posture change process in step S29 shown in FIG. 18. In the posture change process, firstly, in step S40, the processor 81 determines whether or not the current ready posture of the player character is the downward ready posture, based on the posture data stored in the memory. When the determination result in step S40 is positive, the process in step S41 is executed. When the determination result in step S40 is negative, the process in step S43 is executed.

In step S41, the processor 81 determines whether or not the direction of the virtual camera is upward relative to the first reference direction, based on the camera data stored in the memory. When the determination result in step S41 is positive, the process in step S42 is executed. When the determination result in step S41 is negative, the process in step S50 is executed.

In step S42, the processor 81 changes the ready posture of the player character to the horizontal ready posture. That is, the processor 81 updates the content of the posture data stored in the memory so as to indicate the horizontal ready posture. Next to step S42, the process in step S50 is executed.

In step S43, the processor 81 determines whether or not the current ready posture of the player character is the upward ready posture, based on the posture data stored in the memory. When the determination result in step S43 is positive, the process in step S44 is executed. When the determination result in step S43 is negative, the process in step S46 is executed.

In step S44, the processor 81 determines whether or not the current direction of the virtual camera is downward relative to the third reference direction, based on the camera data stored in the memory. When the determination result in step S44 is positive, the process in step S45 is performed. When the determination result in step S44 is negative, the process in step S50 is executed.

In step S45, the processor 81 changes the ready posture of the player character to the horizontal ready posture. That is, the processor 81 updates the content of the posture data stored in the memory so as to indicate the horizontal ready posture. Next to step S45, the process in step S50 is executed.

The process in step S46 is executed when the current ready posture of the player character is the horizontal ready posture. Therefore, in step S46, the processor 81 determines whether or not the direction of the virtual camera is downward relative to the second reference direction, based on the camera data stored in the memory. When the determination result in step S46 is positive, the process in step S47 is executed. When the determination result in step S46 is negative, the process in step S48 is executed.

In step S47, the processor 81 changes the ready posture of the player character to the downward ready posture. That is, the processor 81 updates the content of the posture data stored in the memory so as to indicate the downward ready posture. Next to step S47, the process in step S50 is executed.

In step S48, the processor 81 determines whether or not the direction of the virtual camera is upward relative to the fourth reference direction, based on the camera data stored in the memory. When the determination result in step S48 is positive, the process in step S49 is executed. When the determination result in step S48 is negative, the process in step S50 is executed.

In step S49, the processor 81 changes the ready posture of the player character to the upward ready posture. That is, the processor 81 updates the content of the posture data stored in the memory so as to indicate the upward ready posture. Next to step S49, the process in step S50 is executed.

In step S50, the processor 81 changes the ready posture according to the turn start instruction or the turn end instruction by the player. Specifically, when the turn start instruction is performed by the player while the ready posture of the player character is the horizontal ready posture or the downward ready posture, the processor 81 changes the ready posture of the player character 201 to the upward ready posture. When the turn end instruction is performed by the player while the ready posture of the player character is the upward ready posture, the processor 81 changes the ready posture of the player character 201 to the ready posture (specifically, the horizontal ready posture or the downward ready posture) immediately before the upward ready posture. The processor 81 updates the content of the posture data stored in the memory so as to indicate the ready posture having been changed. Moreover, in step S50, when neither the turn start instruction nor the turn end instruction have been performed by the player, the processor 81 ends the process in step S50 without changing the ready posture. After step S50, the processor 81 ends the posture change process.

Referring back to FIG. 18, after the process in step S29, the process in step S30 is executed. In step S30, the processor 81 sets a shooting direction in which the player character shoots an arrow, based on the direction of the virtual camera. Specifically, the processor 81 sets the shooting direction so as to coincide with the direction of the virtual camera. Moreover, the processor 81 controls the posture and/or direction of the player character such that the player character points the arrow to the shooting direction. In step S30, the type of the ready posture of the player character is not changed. Next to step S30, the process in step S32 is executed.

In step S31, the processor 81 moves the virtual camera according to the falling motion of the player character. At this time, the processor 81 updates the content of the camera data stored in the memory so as to indicate the position and the direction of the virtual camera having been moved. Next to step S31, the process in step S32 is executed.

In step S32, the processor 81 determines whether or not a shooting instruction has been performed by the player. When the determination result in step S32 is positive, the process in step S33 is executed. When the determination result in step S32 is negative, step S33 is skipped and the process in step S34 is executed.

In step S33, the processor 81 causes the player character to perform a shooting action of shooting the arrow. Moreover, the processor 81 causes the arrow object to move to the shooting direction in the game space. In the exemplary embodiment, during the special operation mode, a series of processes in steps S26 to S35 is executed once every predetermined time (e.g., every frame time). The processor 81 may control the motion of the player character to perform the shooting action over a plurality of frames. The processor 81 decreases the stamina of the player character by a predetermined amount according to the shooting of the arrow. Next to step S33, the process in step S34 is executed.

In step S34, the processor 81 creates a game image showing a game space, and displays the game image on the display 12. This game image is created based on the character data updated in steps S22, S24 to S26, S29, S30 and/or S33, and on the camera data updated in step S28 or S31. That is, the player character is placed in the game space at the position changed in step S26 so as to take the posture updated in step S22, S24 to S26, S29, S30 and/or S33. Meanwhile, the virtual camera is located at the position and the direction set in step S28 or S31 such that the player character is included in the field of view of the virtual camera. The processor 81 creates a game image as viewed in a direction according to the direction of the virtual camera from the position of the virtual camera, and displays the game image on the display 12. The game image creating process in step S34 is repeatedly executed once every predetermined time (e.g., every frame time) until the special operation mode is ended. That is, a process loop of steps S26 to S35 is repeatedly executed once every predetermined time until the special operation mode is ended. Next to step S34, the process in step S35 is executed.

In step S35, the processor 81 determines whether or not to end the special operation mode. Various criteria for ending the special operation mode can be set. For example, the processor 81 determines whether or not a ready posture end instruction has been performed by the player, whether or not the stamina of the player character has become 0, and whether or not falling of the player character has ended because, for example, the player character has come into contact with the ground. The processor 81 determines to end the special operation mode when the ready posture end instruction has been performed, when the stamina of the player character has become 0, or when falling of the player character has ended. On the other hand, the processor 81 determines not to end the special operation mode when no ready posture end instruction is performed, the stamina of the player character is not 0, and falling of the player character is not ended yet. When the determination result in step S35 is positive, the processor 81 ends the special operation mode process. When the determination result in step S35 is negative, the process in step S26 is executed again. Thereafter, a series of processes in steps S26 to S35 is repeatedly executed until it is determined to end the special operation mode in step S35.

4. Function and Effect of Exemplary Embodiment, and Modifications

As described above, in the above exemplary embodiment, the game program causes a computer (e.g., the processor 81) of an information processing apparatus (e.g., the main body apparatus 2) to control a player character in a virtual space (e.g., the game space), based on an operation input performed by the player (e.g., an operation input to the controller 3 or 4 as one example of an operation device) (step S2).

Moreover, in a falling state in which the player character is falling in the virtual space, the game program causes the computer to perform the following processes.

a process of controlling at least one of a falling direction and a falling velocity of the player character that is falling, based on a character operation input performed by the player (step S7)

a process of controlling a posture of the player character that is falling, based on a character operation input performed by the player (steps S5, S6)

a process of controlling a direction of a virtual camera, based on a camera operation input performed by the player (step S8)

a process of controlling a position of the virtual camera such that at least the player character is included in a field of view of the virtual camera, based on a position of the player character and the direction of the virtual camera (step S8)

Moreover, in a special operation mode which receives an operation input for causing the player character that is falling to perform a special action including a shooting action of shooting a predetermined object (e.g., an arrow object), the game program causes the computer to perform the following processes.

a process of changing the posture of the player character that is falling, according to a component, regarding at least a pitch direction, of the direction of the virtual camera based on the camera operation input (e.g., changing the posture of the player character such that the direction of the player character as viewed from the virtual camera changes) (step S29)

a process of setting a shooting direction of the predetermined object during the shooting action, according to the direction of the virtual camera based on the camera operation input (step S30)

a process of controlling the player character to perform the shooting action and controlling the predetermined object to move to the shooting direction, based on a shooting operation input performed by the player (step S33)

According to the above configuration, in the special operation mode, the shooting direction is controlled according to the direction of the virtual camera, and the posture of the player character changes according to the direction of the virtual camera. Thus, the range of the shooting direction can be increased while causing the player character to take a natural posture.

MODIFICATIONS REGARDING SHOOTING ACTION

In the exemplary embodiment, the player character performs, as the shooting action, an action of shooting an arrow with a bow, and an arrow object is shot as the predetermined object. The content of the shooting action is arbitrary, and the content of the predetermined object shot by the shooting action is also arbitrary. For example, in another embodiment, the player character may perform, as the shooting action, an action of shooting a gun, an action of throwing an object (e.g., a weapon) that the player character grasps, or an action of emitting a fireball by a magic.

In the exemplary embodiment, the player character performs, as the special action, an action of taking a ready posture, and a shooting action. In another embodiment, the special action may include at least the shooting action, and may not necessarily include actions other than the shooting action. The special action may include an action different from the action of taking a ready posture.

In another embodiment, the game system 1 may not necessarily include a part of the components included in the exemplary embodiment, and may not necessarily perform a part of the processes performed in the exemplary embodiment. For example, in order to achieve a certain specific effect of the exemplary embodiment, the game system 1 may include a component for producing the effect and perform a process for producing the effect, in other words, the information processing system may not necessarily include the other components and perform the other processes.

The exemplary embodiment is usable as, for example, a game system and a game program for the purpose of, for example, increasing the degree of freedom of the direction in which a player character performs an action while naturally expressing the posture of the player character in midair.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A game processing method executed by an information processing system including a processor, the method comprising:
   controlling a player character in a virtual space, based on an operation input performed by a player,
   in a falling state in which the player character is falling in the virtual space,
      controlling at least one of a falling direction and a falling velocity of the player character that is falling, and also a posture of the player character that is falling, based on a character operation input performed by the player,
      controlling a direction of a virtual camera, based on a camera operation input performed by the player, and
      controlling a position of the virtual camera such that at least the player character is included in a field of view of the virtual camera, based on a position of the player character and the direction of the virtual camera, and
   when the player character is falling in the virtual space:
   receiving, from the player, input specifying a falling type selected from a plurality of different falling types,
   wherein the plurality of different falling types include a first falling type having a first falling velocity applicable to the player character, a second falling type having a second falling velocity applicable to the player character, and a third falling type having a third falling velocity applicable to the player character, and
   wherein the second falling velocity is lower than the first falling velocity, and the third falling velocity is lower than the first falling velocity and higher than the second falling velocity; and
   controlling the player character to fall in accordance with the specified falling type.

2. The method of claim 1, wherein the posture of the player character that is falling is changed according to a component, regarding at least a pitch direction, of the direction of the virtual camera based on the camera operation input.

3. The method of claim 1, wherein the plurality of different falling types include a fourth falling type having a fourth falling velocity applicable to the player character, wherein the fourth falling velocity is greater than the first falling velocity.

4. A non-transitory computer readable storage medium storing instructions that, when executed, cause a processor to perform operations comprising:
   controlling a player character in a virtual space, based on an operation input performed by a player,
   in a falling state in which the player character is falling in the virtual space,
      controlling at least one of a falling direction and a falling velocity of the player character that is falling, and also a posture of the player character that is falling, based on a character operation input performed by the player,
      controlling a direction of a virtual camera, based on a camera operation input performed by the player, and
      controlling a position of the virtual camera such that at least the player character is included in a field of view of the virtual camera, based on a position of the player character and the direction of the virtual camera, and
   when the player character is falling in the virtual space:
   receiving, from the player, input specifying a falling type selected from a plurality of different falling types,
   wherein the plurality of different falling types include a first falling type having a first falling velocity applicable to the player character, a second falling type having a second falling velocity applicable to the player character, and a third falling type having a third falling velocity applicable to the player character, and
   wherein the second falling velocity is lower than the first falling velocity, and the third falling velocity is lower than the first falling velocity and higher than the second falling velocity; and
   controlling the player character to fall in accordance with the specified falling type.

* * * * *